(12) United States Patent
Oshiama et al.

(10) Patent No.: US 6,742,007 B1
(45) Date of Patent: May 25, 2004

(54) PROGRAMMABLE DIGITAL ARITHMETIC CIRCUIT, DEVICE USING PROGRAMMABLE DIGITAL ARITHMETIC CIRCUIT AND METHOD FOR MAKING A PROGRAMMABLE DIGITAL ARITHMETIC CIRCUIT

(75) Inventors: Hiroyasu Oshiama, Kanazawa (JP); Hiroaki Takano, Kahoku (JP); Takahiro Shimada, Ishikawa (JP)

(73) Assignee: Kanazawa Institute of Technology, Ishikawa-Ken (JP)

( * ) Notice: Subject to any disclaimer, the term of this patent is extended or adjusted under 35 U.S.C. 154(b) by 513 days.

(21) Appl. No.: 09/716,290

(22) Filed: Nov. 21, 2000

(30) Foreign Application Priority Data

Dec. 24, 1999 (JP) ............................................ 11-377051

(51) Int. Cl.$^7$ ................................................ G06F 7/38
(52) U.S. Cl. ...................................... 708/230; 708/490
(58) Field of Search ................................ 708/230–236; 326/37, 38, 47

(56) References Cited

U.S. PATENT DOCUMENTS

| 5,436,514 A | * | 7/1995 | Agrawal et al. | ............ 708/230 |
| 6,003,054 A | | 12/1999 | Oshima et al. | ............ 708/230 |
| 6,243,664 B1 | * | 6/2001 | Nazarian et al. | ............... 326/41 |

* cited by examiner

Primary Examiner—Tan V. Mai
(74) Attorney, Agent, or Firm—Rader, Fishman & Grauer PLLC

(57) ABSTRACT

In a programmable digital arithmetic circuit, each input/output terminal of the necessary elemental circuit is connected via a matrix switches.in order to selectively constitute multiple types of basic digital arithmetic circuits that differ from each other. By turning on and off each switching element of the matrix switches, any one of the above-mentioned desired basic digital arithmetic circuits can be selectively constituted. Changing the functions is realized by a matrix switches and during the setting of the coefficients a purely physical coefficient value can be chosen so that a programmable digital arithmetic circuit that can be easily understand and handled by users will be constituted.

16 Claims, 29 Drawing Sheets

PROGRAMMABLE DIGITAL ARITHMETIC CIRCUIT, DEVICE USING PROGRAMMABLE DIGITAL ARITHMETIC CIRCUIT AND METHOD FOR MAKING A PROGRAMMABLE DIGITAL ARITHMETIC CIRCUIT

FIELD OF THE INVENTION

The present invention relates to a programmable digital arithmetic circuit, particularly, a Programmable Digital Arithmetic IC (PDIC). The PDIC of this invention has a large benefit when used as an arithmetic system such as various simulators and a programmable digital control board (a substrate having a dedicated transmission function by programming the standard substrate offline).

BACKGROUND OF THE INVENTION

When an operational amplifier, resistor and capacitors are appropriately combined and wired, depending on the difference in the combinations and wiring, it is possible to realize a variety of basic analog arithmetic circuits that carry out specific mathematical operations. In addition, when each of the basic analog arithmetic circuits are converted to a digital circuit by applying Kirchhoff's law, it is possible to realize basic digital arithmetic circuits that are equivalent to each basic analog arithmetic circuit. These digital arithmetic circuits are comprised of an adder (adding circuit), coefficient unit (coefficient circuit), and integrator (integrator circuit). The above has already been demonstrated in U.S. Pat. No. 6,003,054 (hereinafter referred to as "'054 patent")). Moreover, a digital arithmetic circuit comprising an adder, coefficient unit and integrator can constitute a digital polyarithmetic IC that can selectively constitute said variety of different basic digital arithmetic circuits by changing the coefficient value of the coefficient unit, namely, a general-purpose digital arithmetic IC that can select from a multiplicity of operational functions. In addition, by extending and connecting the multiplicity of above-mentioned general-purpose digital arithmetic ICs in a crisscross pattern, it is possible to constitute the desired digital arithmetic circuit. This fact also has been discussed in '054 patent.

A microprocessor, DSP (Digital Signal Processor) and DDA (Digital Differential Analyzer) are examples of digital arithmetic ICs. These are sequential processing types based on the Neumann Computer and software interferes with the operational process, consequently, it is difficult to increase the speed of the operational process.

SUMMARY OF THE INVENTION

The present invention is to further develop the technological philosophy of the PDIC described in '054 patent, and to contrive a circuit structure so that it is clear and easy to use by the users of a PDIC. In other words, the PDIC described in '054 patent was not easy to handle for users because changing the functions and settings of the coefficients was realized through the setting of the coefficient value. In this invention, the change in the functions and settings of the coefficients of the PDIC are separated. Changing the functions is realized by a matrix switches and during the setting of the coefficients a purely physical coefficient value can be chosen so that a PDIC circuit that can be easy to understand and handle, for users will be constituted. In addition, in the present invention, the number of coefficient units in the PDIC is reduced by using a matrix switches so that the circuit size of the entire PDIC is reduced and consequently an inexpensive PDIC is constituted.

In order to solve the above-mentioned problems, the present invention is constituted such that each input/output terminal of the element circuit such as an integrator, differentiator, adder and coefficient unit are connected to each other via a matrix switches. By selectively turning on and off each switching element of said matrix switches, the necessary digital arithmetic circuit is selectively constituted. In other words, a matrix switches is added to the digital arithmetic IC as a circuit structure control element (circuit selection control element) for the digital arithmetic circuit, and during the selection of the digital arithmetic circuit with the desired operational functions, without relying on the coefficient value of the coefficient unit, the necessary digital arithmetic circuit is selectively constituted by selectively turning on and off the switching elements of the matrix switches.

If the number (type) of the functions desired for the PDIC is finite, the intersections that need to be turned on and off from among all the intersections of the matrix on the matrix switches are limited. Therefore, the PDIC is completed by arranging the switching elements only at the necessary intersections.

PREFERRED EMBODIMENTS OF THE INVENTION

Figure 1:
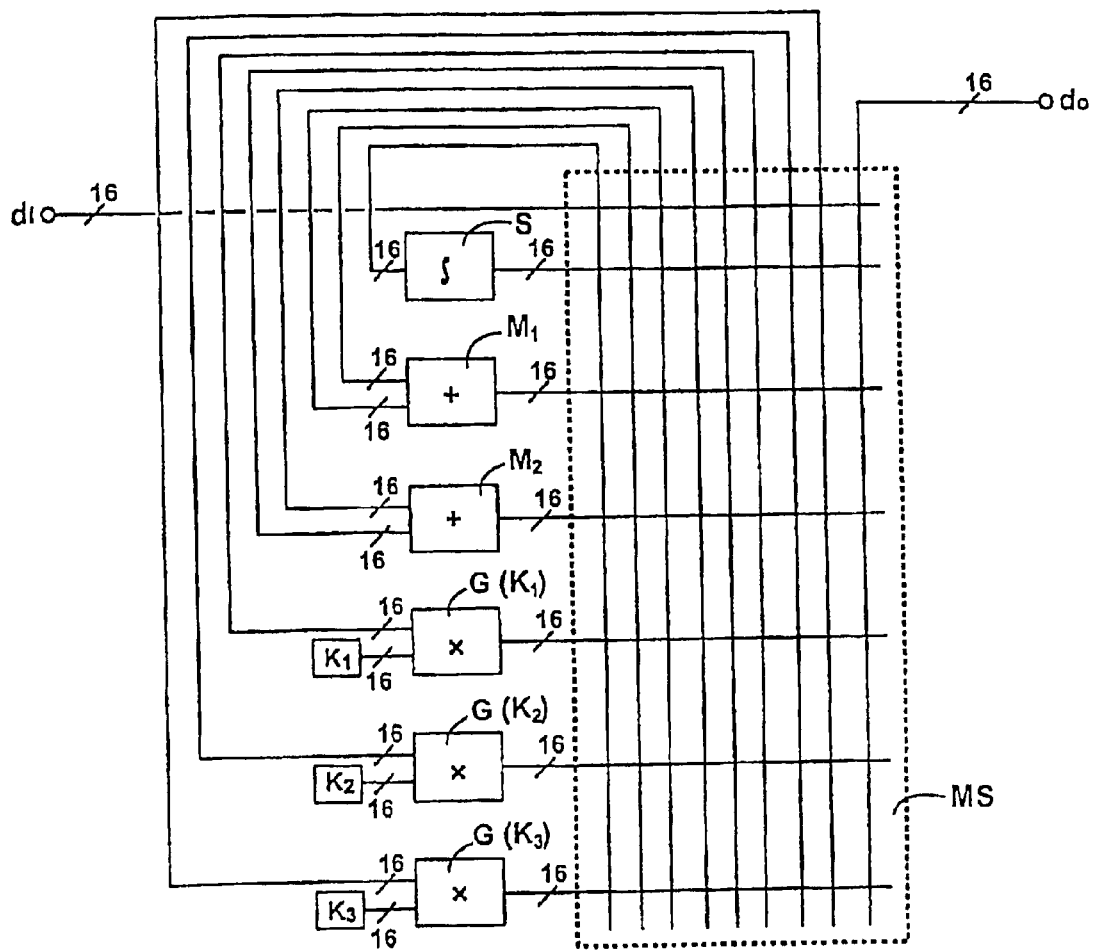
FIG. 1 is a basic circuit diagram showing an embodiment of PDIC of this invention.

One of the basic embodiments of the present invention is a programmable digital arithmetic IC such that the input/output terminals of an elemental circuit necessary to selectively constitute multiple types of basic digital arithmetic circuits with operational functions that differ from each other are connected to each other through a matrix switches, and by turning on and off said switching elements of said matrix switches any one of said basic digital arithmetic circuits can be selectively constituted.

Another basic embodiment of the present invention is a programmable digital arithmetic IC such that the input/output terminals of an integrators and/or differentiator, adders and coefficient units that are necessary to selectively comprise multiple types of basic digital arithmetic circuits with operational functions that differ from each other, are connected to each other via a matrix switches, and by turning on and off each switching element of the matrix switches any one of the above-mentioned desired basic digital arithmetic circuits can be selectively constituted.

Another basic embodiment of the present invention is a programmable digital arithmetic IC such that from among the number of integrator(s) and/or the number of differentiator(s), the number of adder(s), and the number of coefficient unit(s) comprising multiple types of basic digital arithmetic circuits with operational functions that differ from each other, the largest possible number of integrator(s) and/or differentiator(s), adder(s) and coefficient unit(s) can be provided and each of the input/output terminals of said integrator(s) and/or differentiator(s), adder(s) and coefficient unit(s) are connected with each other via a matrix switches, and by turning on and off each switching element of the matrix switches, any one of the above-mentioned desired basic digital arithmetic circuits can be selectively constituted.

Another basic embodiment of the present invention is a programmable digital arithmetic circuit such that two or more programmable digital arithmetic IC in which the input/output terminals of the digital integrator(s) and/or digital differentiator(s), adder(s) and coefficient unit(s) are connected with each other via a matrix switches, are connected in cascade and by turning on and off each switching element of the matrix switches any one of the above-mentioned desired basic digital arithmetic circuits can be selectively constituted.

Another basic embodiment of the present invention is a variety of devices such as a simulator, emulator or programmable digital control board device using a programmable digital arithmetic IC characterized by having the input/output terminals of the elemental circuits necessary to selectively constitute multiple types of basic digital arithmetic circuits with operational functions that differ from each other connected to each other via a matrix switches, and by turning on and off said switching elements of said matrix switches the necessary programmable digital control board device can be selectively constituted.

Another basic embodiment of the present invention is a manufacturing method for a programmable digital arithmetic IC such that after multiple types of basic analog arithmetic circuits, having the necessary operational functions that differ from each other, are selected, each of the basic analog arithmetic circuits is converted into an equivalent basic digital arithmetic circuit, and then the necessary number of integrator(s) and/or differentiator(s), adder(s) and coefficient unit(s) in order to constitute any one of the basic digital arithmetic circuits is selected, and each input/output terminal of each of the integrator(s) and/or differentiator(s), adder(s) and coefficient unit(s) is connected with each other via a matrix switches.

Another basic embodiment of the present invention is a manufacturing method for a programmable digital arithmetic IC such that after multiple types of basic analog arithmetic circuits, having the necessary operational functions that differ from each other, are selected, each of the basic analog arithmetic circuits are converted to an equivalent basic digital arithmetic circuit, and then the necessary number of integrator(s) and/or differentiator(s), adder(s) and coefficient unit(s) in order to constitute any one of the basic digital arithmetic circuits is selected, and then, each input/output terminal of each of the integrator(s) and/or differentiator(s), adder(s) and coefficient unit(s) is connected with each other via a matrix switches. The intersections, which are required to be turned on/off for the basic digital arithmetic circuits that carry out said necessary operational functions, are selected from all the intersections of the matrix switches and the switching elements are provided only for the selected intersections.

Embodiment

The embodiments of the present invention are described as follows by referring to drawings. First, the multiple types of basic analog arithmetic circuits having the necessary operational functions that differ from each other are determined. In this embodiment, twelve types of basic analog arithmetic circuits, (a-1), (a-2), (a-3), (a-4), (a-5), (a-6), (a-7), (a-8), (a-9), (a-10), (a-11) and (a-12) are shown in FIGS. 25A and 25B.

Basic analog arithmetic circuit (a-1) functions as a primary first order lag integral basic analog arithmetic circuit.

Basic analog arithmetic circuit (a-2) functions as the secondary first order lag integral basic analog arithmetic unit. Basic analog arithmetic circuit (a-3) functions as the primary proportional integral basic analog arithmetic circuit. Basic analog arithmetic circuit (a-4) functions as the primary approximate differentiation basic analog arithmetic circuit. Basic analog arithmetic circuit (a-5) functions as the secondary proportional integral basic analog arithmetic circuit. Basic analog arithmetic circuit (a-6) functions as the secondary approximate differentiation basic analog arithmetic circuit. Basic analog arithmetic circuit (a-7) functions as the primary proportional differentiationbasic analog arithmetic circuit. Basic analog arithmetic circuit (a-8) functions as the secondary proportional differentiation basic analog arithmetic circuit. Basic analog arithmetic circuit (a-9) functions as the primary capacitive compensation basic analog arithmetic circuit. Basic analog arithmetic circuit (a-10) functions as the secondary capacitive compensation basic analog arithmetic circuit. Basic analog arithmetic circuit (a-11) functions as the primary aperiodic basic analog arithmetic circuit. And basic analog arithmetic circuit (a-12) functions as the secondary aperiodic basic analog arithmetic circuit. In the above-mentioned basic analog arithmetic circuit, P is an operational amplifier (op-amp), $R_1$, and $R_2$ are resistors having resistance values of $R_1$, and $R_2$, respectively, $C_1$, and $C_2$ are capacitors having capacitance of $C_1$, and $C_2$, respectively, $e_i$ is an input terminal, and $e_0$ is an output terminal.

Figure 25A:
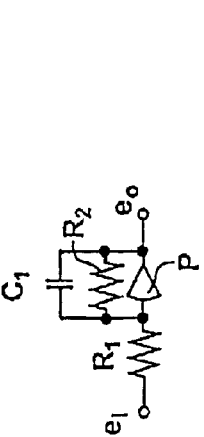
FIGS. 25A and 25B are explanatory diagrams for showing twelve types of basic analog arithmetic circuits.
Figure 25B:
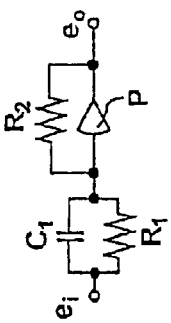

Next, using Kirchhoff's law, twelve types of basic analog arithmetic circuits (a-1) to (a-12) which are shown in FIGS. 25A and 25B are converted to basic digital arithmetic circuits (d-1) to (d-12) which are equivalent to each of the basic analog arithmetic circuits.

Figure 26A:
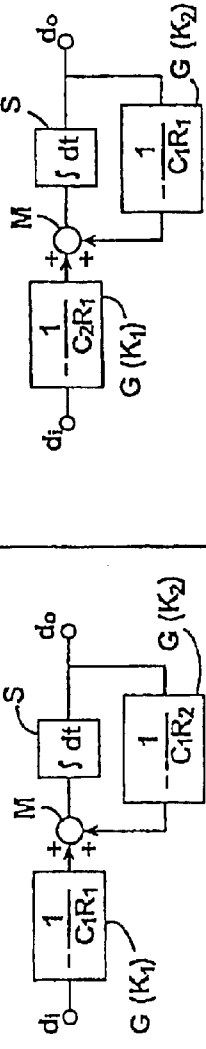
FIGS. 26A, 26B and 26C are explanatory diagrams for showing twelve types of basic digital arithmetic circuits which correspond to and are equivalent to basic analog arithmetic circuits shown in FIGS. 25A and 25B.
Figure 26B:
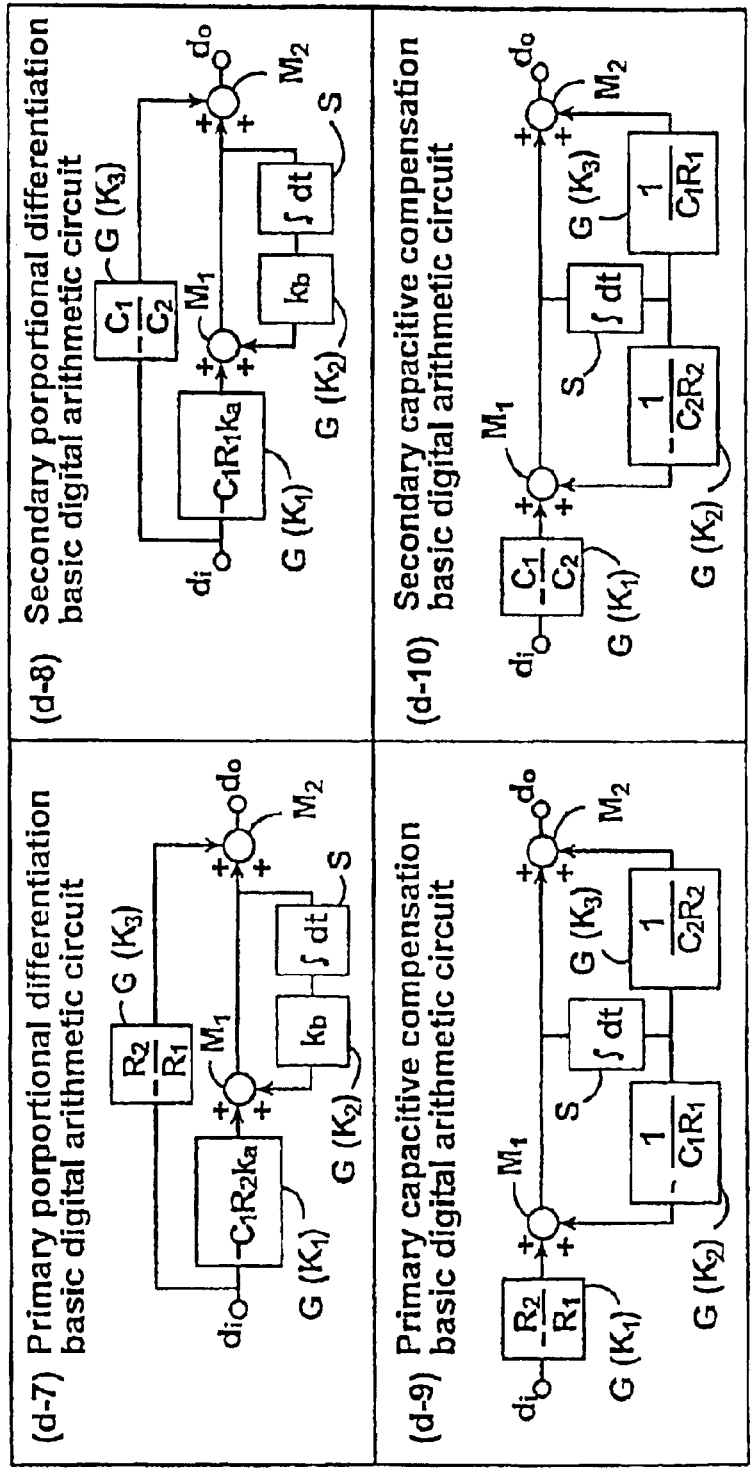
Figure 26C:
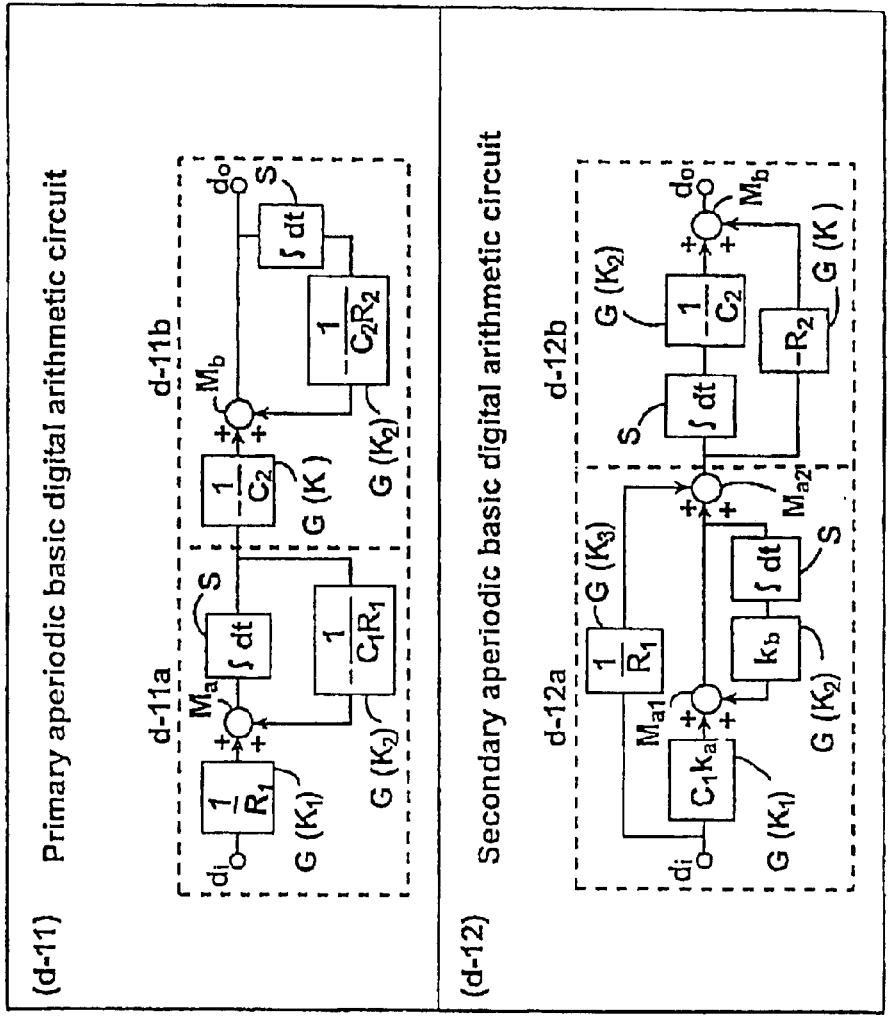

FIGS. 26A, 26B and 26C show basic digital arithmetic circuits (d-1), (d-2), (d-3), (d-4), (d-5), (d-6), (d-7), (d-8), (d-9), (d-10), (d-11), and (d-12), which correspond to and are equivalent to basic analog arithmetic circuits (a-1), (a-2), (a-3), (a-4), (a-5), (a-6), (a-7), (a-8), (a-9), (a-10), (a-11) and (a-12) respectively. Basic digital arithmetic circuit (d-1) functions as the primary first order lag integral basic digital arithmetic circuit. Basic digital arithmetic circuit (d-2) functions as the secondary first order lag integral basic digital arithmetic unit. Basic digital arithmetic circuit (d-3) functions as the primary proportional integral basic digital arithmetic circuit. Basic digital arithmetic circuit (d-4) functions as the primary approximate differentiation basic digital arithmetic circuit. Basic digital arithmetic circuit (d-5) functions as the secondary proportional integral basic digital arithmetic circuit. Basic digital arithmetic circuit (d-6) functions as the secondary approximate differentiation basic digital arithmetic circuit. Basic digital arithmetic circuit (d-7) functions as the primary proportional differentiation basic digital arithmetic circuit. Basic digital arithmetic circuit (d-8) functions as the secondary proportional differentiation basic digital arithmetic circuit. Basic digital arithmetic circuit (d-9) functions as the primary capacitive compensation basic digital arithmetic circuit. Basic digital arithmetic circuit (d-10) functions as the secondary capacitive compensation basic digital arithmetic circuit. Basic digital arithmetic circuit (d-11) functions as the primary aperiodic basic digital arithmetic circuit. Basic digital arithmetic circuit (d-12) functions as the secondary aperiodic basic digital arithmetic circuit. In the basic digital arithmetic circuits shown in FIGS. 26A, 26B and 26C, S is an integrator, M, $M_1$, $M_2$, Ma, Mb, $Ma_1$ and $Ma_2$ are adders, $G(K_1)$ is a coefficient unit having a coefficient value of $K_1$, $G(K_2)$ is a coefficient unit having a coefficient value of $K_2$, $G(K_3)$ is a coefficient unit having a coefficient value of $K_3$, $d_i$ is an input terminal, and $d_0$ is an output terminal. As is clear from FIG. 26B, basic digital arithmetic circuits, (d-7), (d-8), (d-9) and (d-10) have the most number of modules constituting the circuit from among the basic digital arithmetic circuits of (d-1) to (d-10) and for each, an integrator S, two adders $M_1$, and $M_2$ and three coefficient units $G(K_1)$, $G(K_2)$ and $G(K_3)$ are used.

The present invention allows the user of the IC to select the desired arithmetic circuit from among the digital arithmetic circuits that have different predetermined operational functions from each other and carry out the setting. Therefore, circuit structure control means that changes to the circuit structure on the IC is required. The present invention utilizes a matrix switches as the means of circuit structure control. In this embodiment, one integrator, two adders and three coefficient units, which are the minimum requirements in order to arbitrarily set any one of said basic digital arithmetic circuits (d-1) to (d-10) shown in FIGS. 26A and 26B, are added with the matrix switches as the means of circuit structure control, and by operating the matrix switches, a PDIC is constituted by selecting any one of basic digital arithmetic circuits (d-1) to (d-10).

Figure 2:
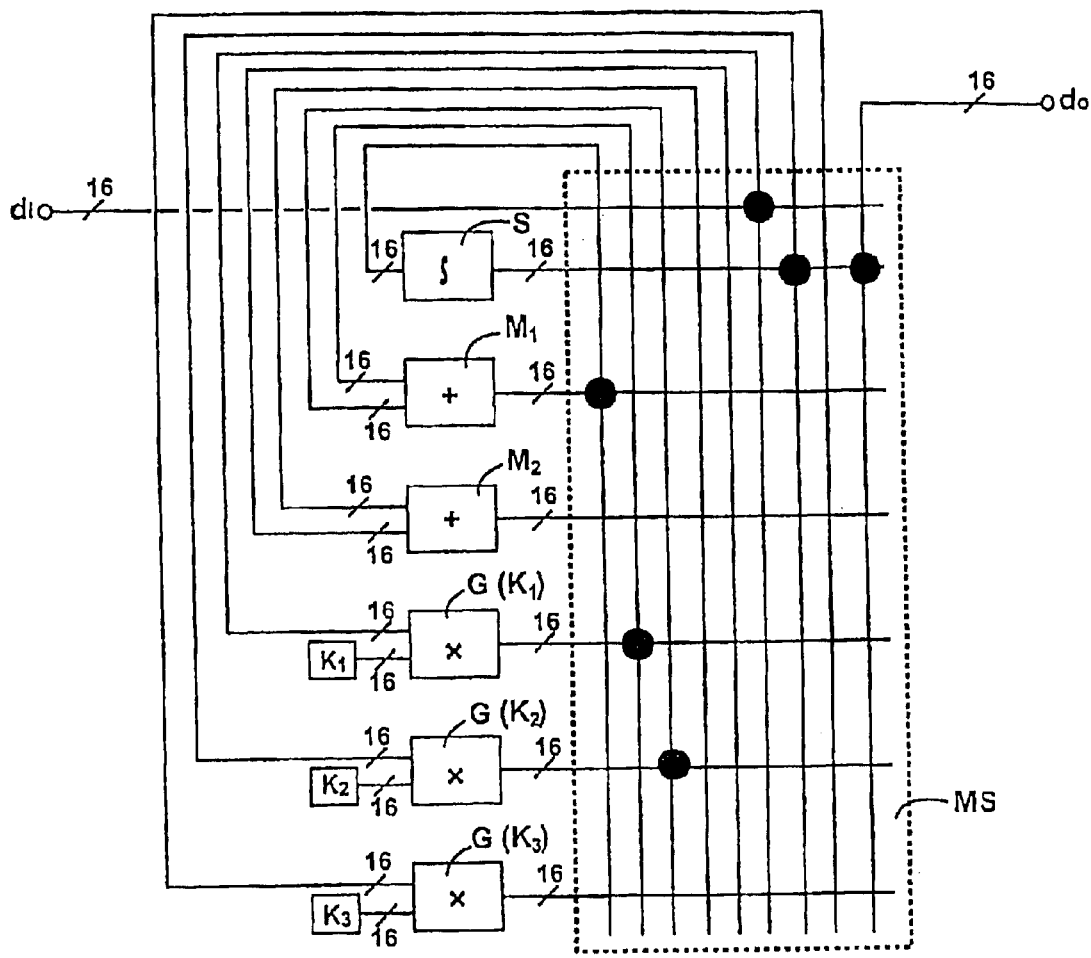
FIG. 2 is an explanatory diagram for showing conversion of PDIC of FIG. 1 into digital arithmetic basic circuits (d-1) and (d-2).

In other words, as shown in FIG. 1, the circuit can he constituted such that the input/output terminals $d_i$ and do for integrator S, the two adders $M_1$, and $M_2$, and the three coefficient units $G(K_1)$, $G(K_2)$ and $G(K_3)$ are connected via matrix switches MS with each other, and by appropriately turning on and off the switching elements provided at the intersections of the matrix of matrix switches MS, any one of the basic digital arithmetic circuits (d-1) to (d-10) can be selected. In this embodiment, matrix switches MS has a 16-bit function and there are 16 switches per intersection. FIG. 2 shows the operation of the matrix switches MS during the selection of the basic digital arithmetic circuits (d-1) or (d-2). At the intersections with a black dot, the switching element is set to be on and at the intersections without a black dot, the switching element is set to be off. Depending on how the coefficient values of $K_1$, and $K_2$ of the coefficient units $G(K_1)$ and $G(K_2)$ are combined as shown in FIG. 2, either basic digital arithmetic circuit (d-1) or (d-2) is selected.

Figure 3:
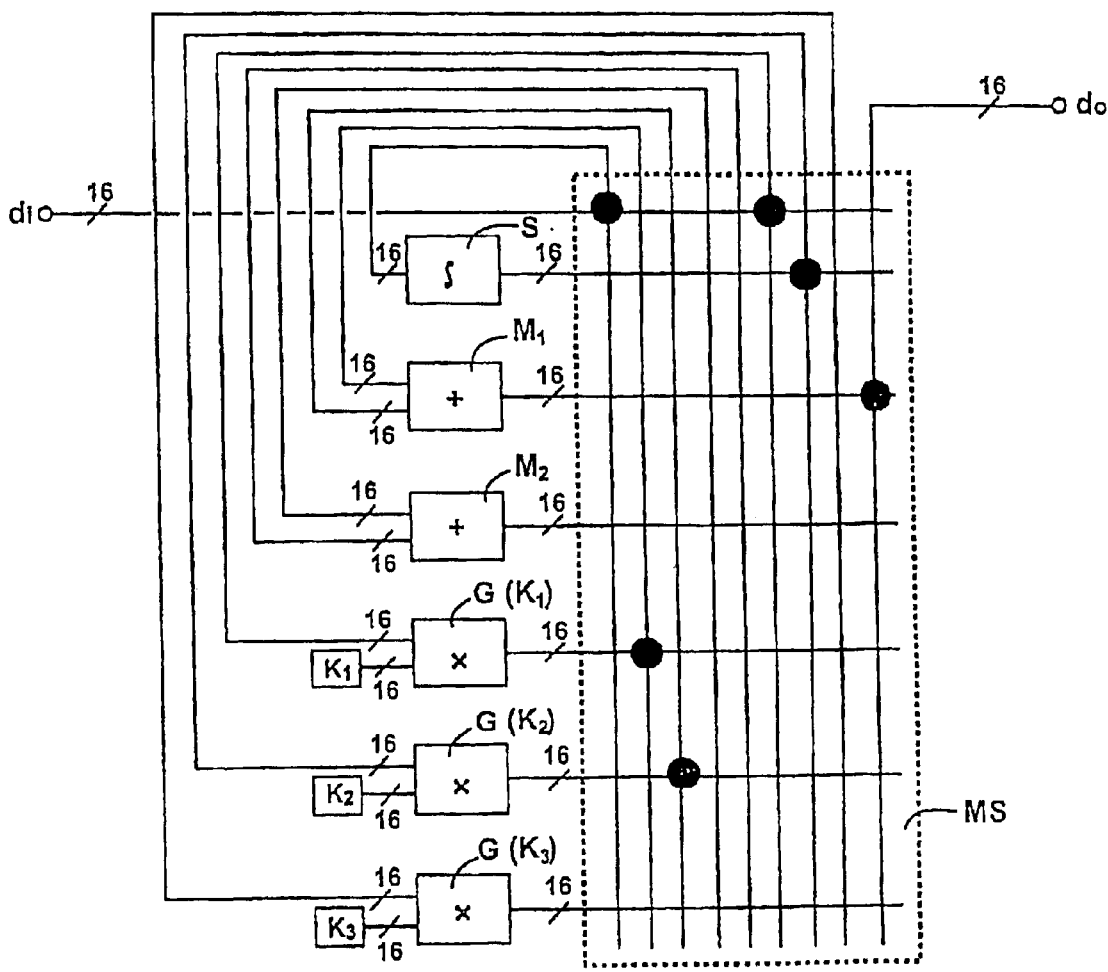
FIG. 3 is an explanatory diagram for showing conversion of PDIC of FIG. 1 into digital arithmetic basic circuits (d-3) and (d-5).
Figure 4:
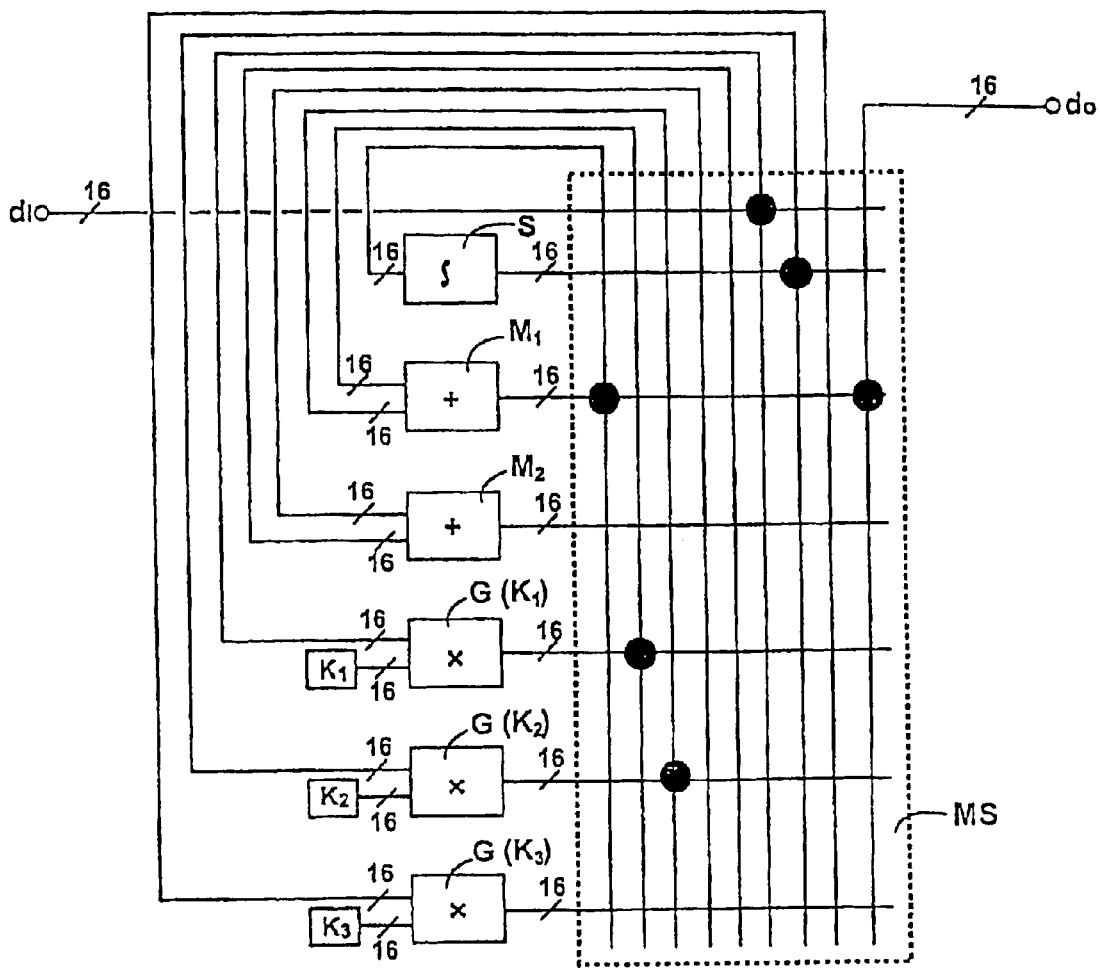
FIG. 4 is an explanatory diagram for showing conversion of PDIC of FIG. 1 into digital arithmetic basic circuits (d-4) and (d-6).
Figure 5:
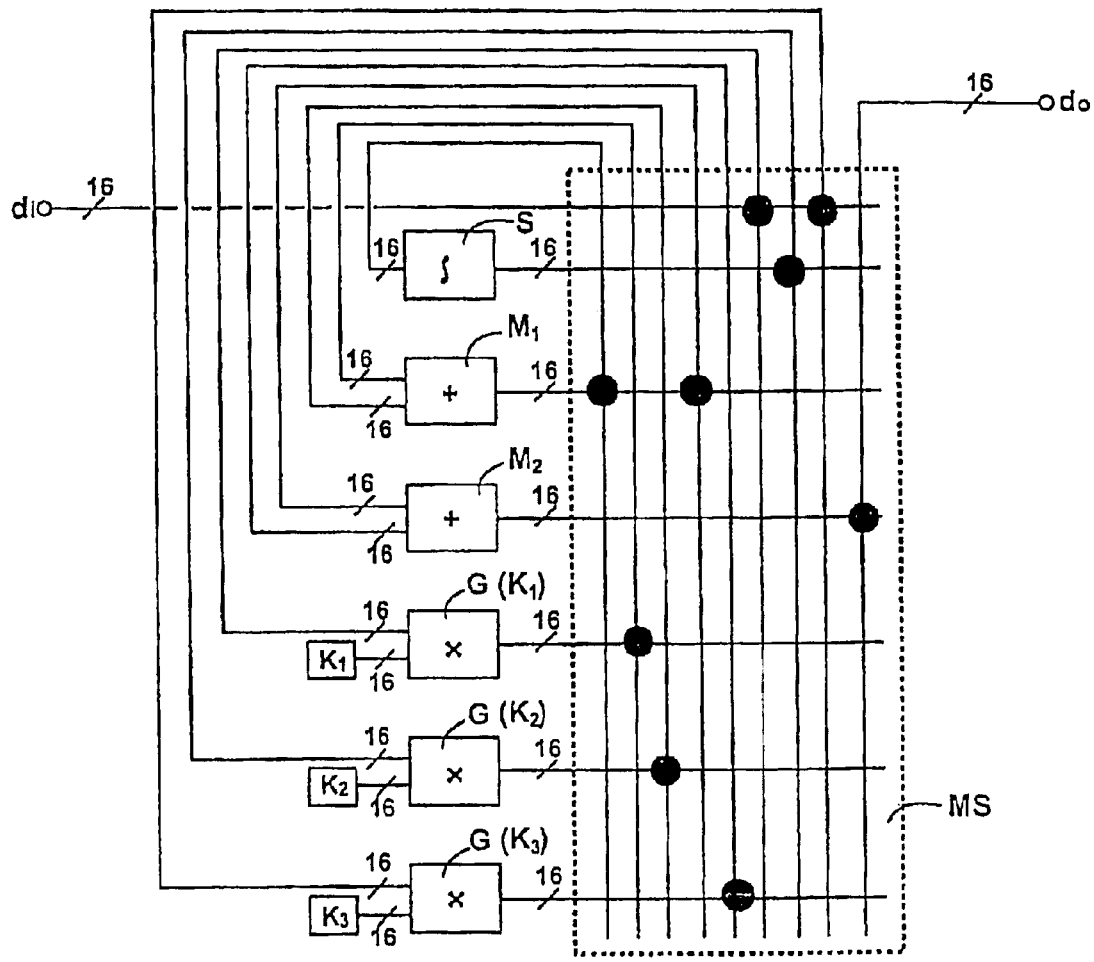
FIG. 5 is an explanatory diagram for showing conversion of PDIC of FIG. 1 into digital arithmetic basic circuits (d-7) and (d-8).

As described for FIG. 2, FIG. 3 shows the operation of the matrix switches MS when basic digital arithmetic circuit (d-3) or (d-5) is selected. FIG. 4 shows the operation of the matrix switches MS when basic digital arithmetic circuit (d-4) or (d-6) is selected. FIG. 5 shows the operation of the matrix switches MS when basic digital arithmetic circuit (d-7) or (d-8) is selected, and FIG. 6 shows the operation of the matrix switches MS when basic digital arithmetic circuit (d-9) or (d-10) is selected.

Figure 6:
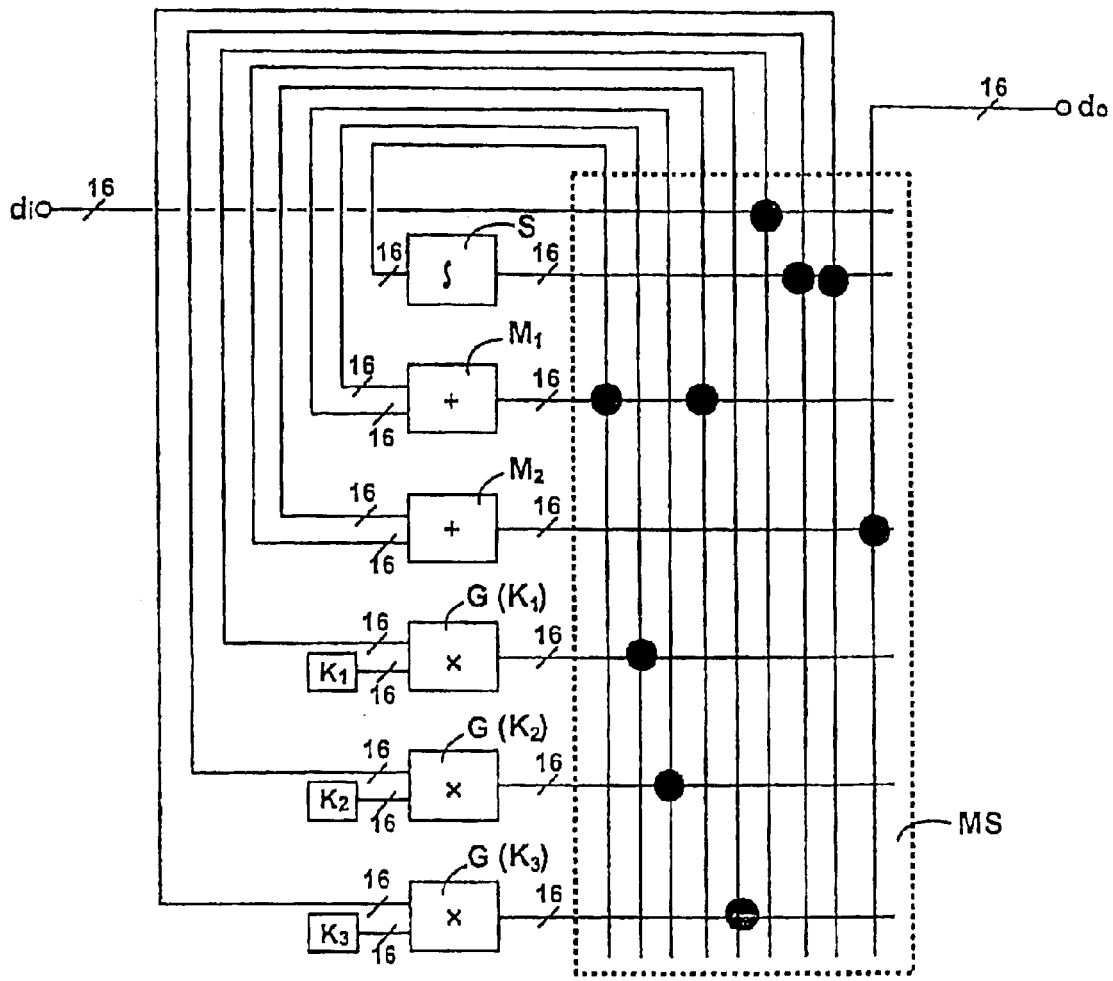
FIG. 6 is an explanatory diagram for showing conversion of PDIC of FIG. 1 into digital arithmetic basic circuits (d-9) and (d-10).
Figure 7:
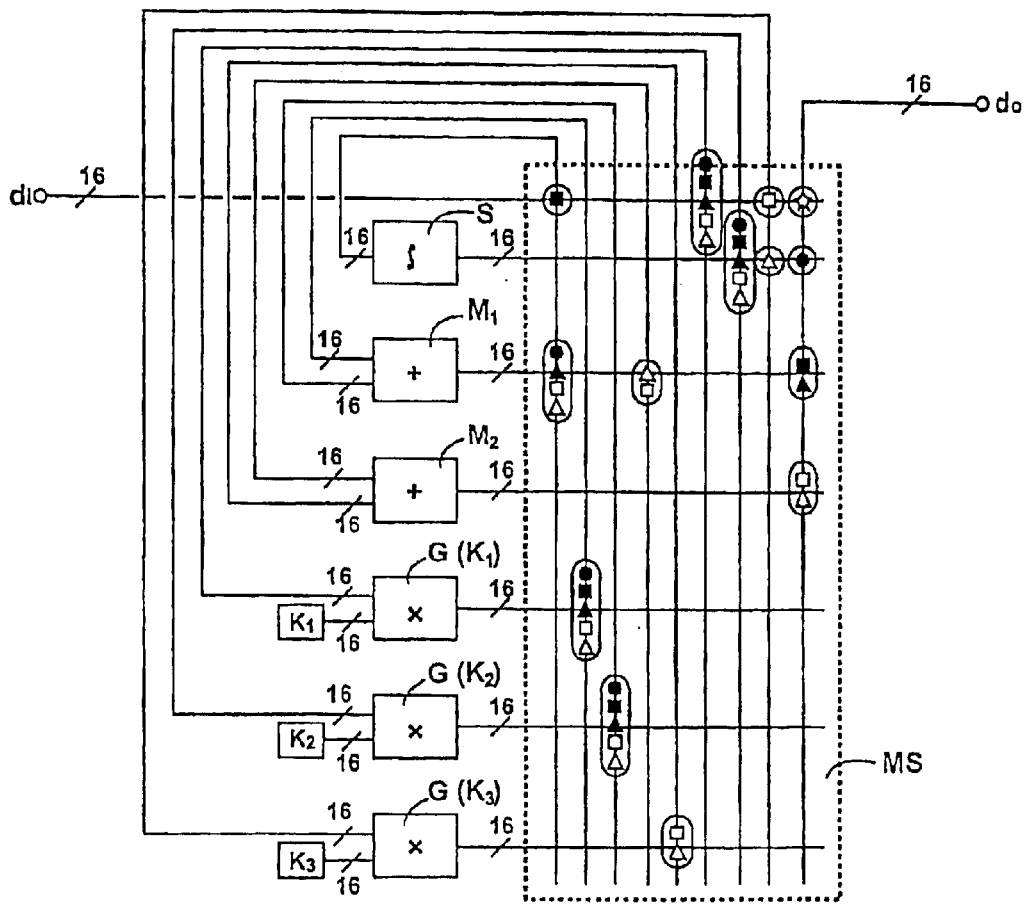
FIG. 7 is an explanatory diagram showing operation of switching elements at each of matrix intersections shown in FIG. 1.

FIG. 7 shows the on or off state of the switching elements at each overlaid on said FIGS. 2 to 6. The symbols ●, ■, ▲, □ and ∆ in the matrix switches MS of FIG. 7 show the cases where the circuits (d-1) and (d-2) of FIG. 2 are selected, the circuits (d-3) and (d-5) of FIG. 3 are selected, the circuits (d-4) and (d-6) of FIG. 4 are selected, the circuits (d-7) and (d-8) of FIG. 5 are selected, and the circuits (d-9) and (d-10) of FIG. 6 are selected, respectively. The symbol ☆ of FIG. 7 is a bypass switch. When the bypass switch ☆ is closed, signals entering the input terminal di go out from the output terminal $d_0$ directly. As is clear from FIG. 7, when any one of basic digital arithmetic circuits (d-1) to (d-10) is selected, there are four intersections where the switching elements can be left on in those cases where the five symbols ●, ■, ▲, □ and ∆ are present. There are 10 intersections that require the operation of being turned on and off, where any one of the six symbols ●, ■, ▲, □ and Δ and ☆ presents. It is understood that the other intersections having no such a symbol can be left off. Therefore, at the intersections that can be on all the time there is no need to provide a switching element, so that the intersection can be a fixed connection, and the intersections that can be left off all the time do not require the providing of a switching element.

Figure 8:
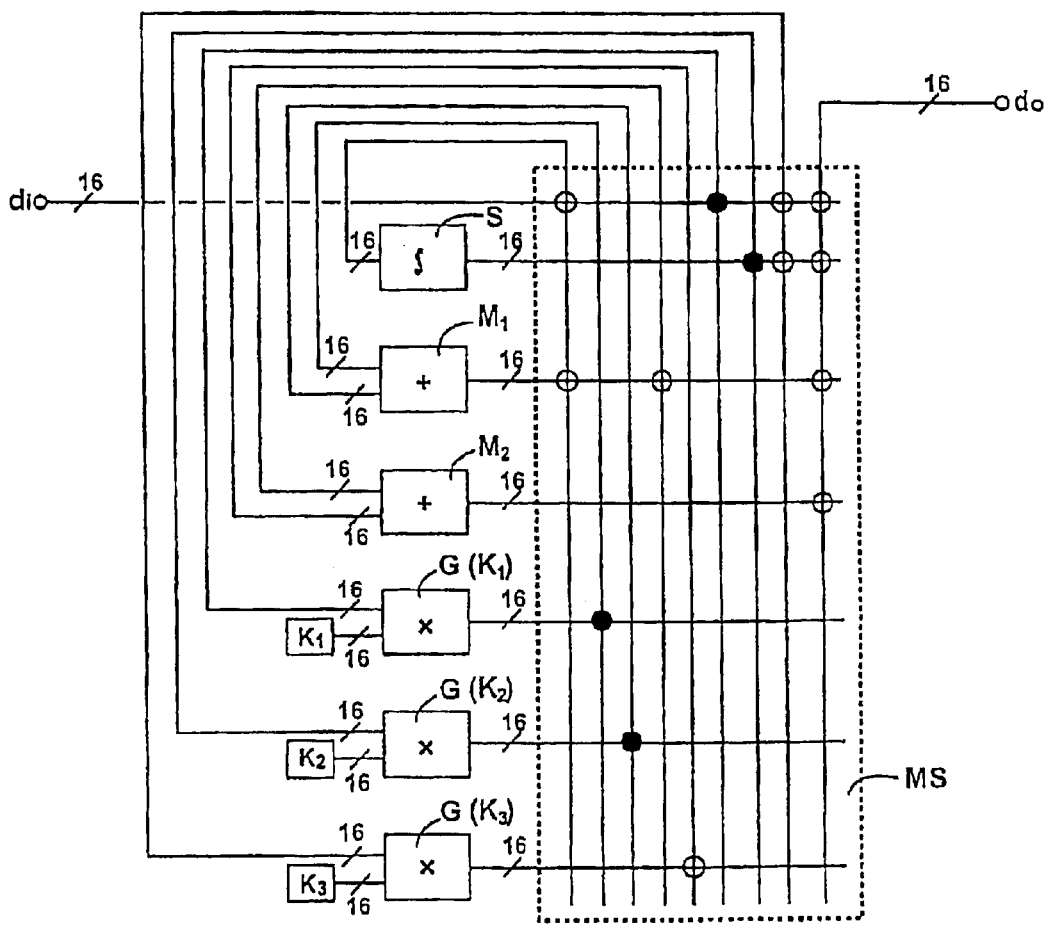
FIG. 8 is a schematic diagram showing arrangements of switching elements related to matrix switches of PDIC shown in FIG. 1.

FIG. 8 shows the ten intersections with a white circle ○ where the switching elements must be provided. FIG. 8 also shows the four intersections with a black circle ● where the intersections are left on and connected at any time. The intersections where no symbols are assigned are left open or off at any time and require no switches.

Figure 9:
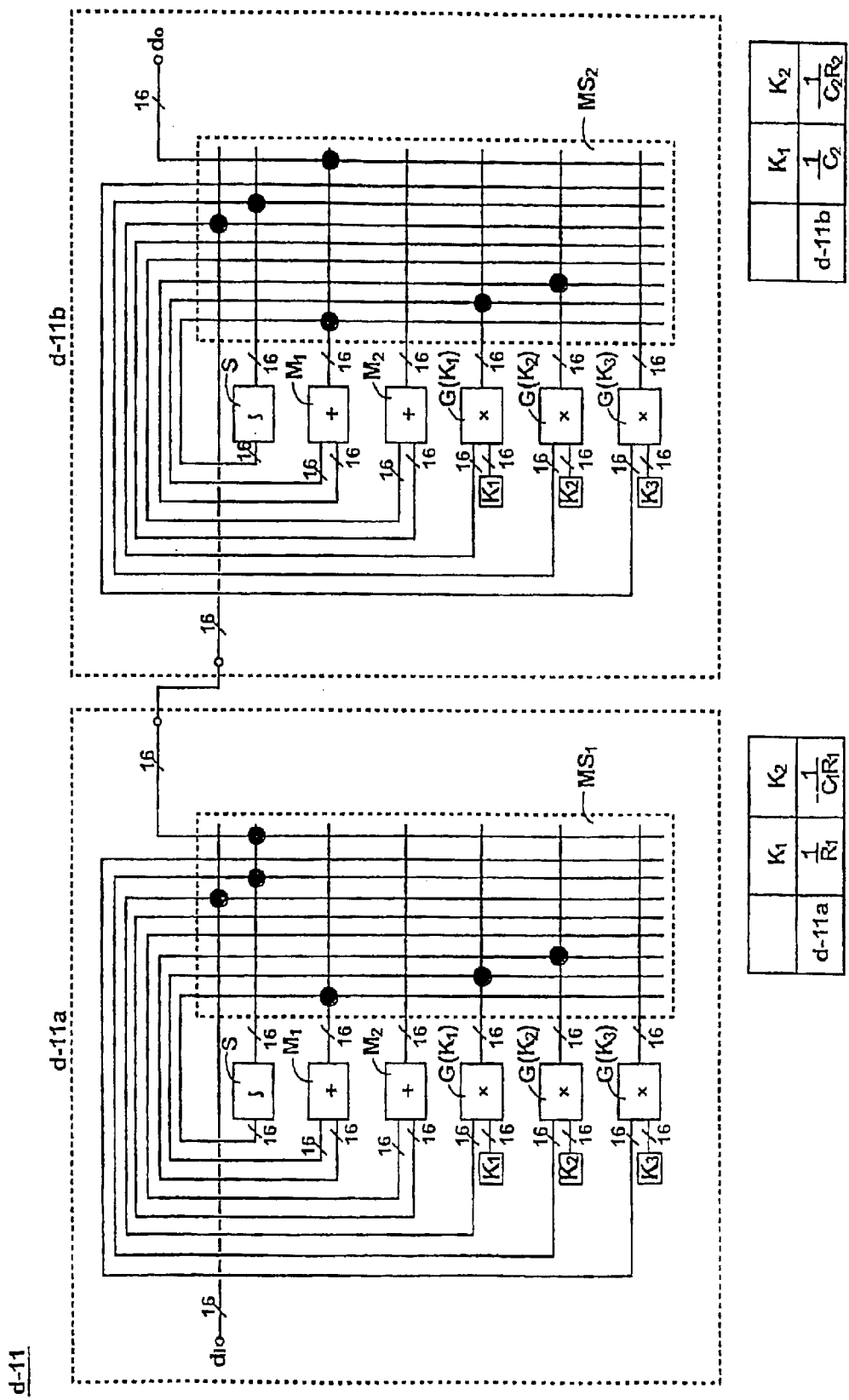
FIG. 9 is an explanatory diagram for showing conversion of PDIC of FIG. 1 into digital arithmetic basic circuit (d-11).
Figure 10:
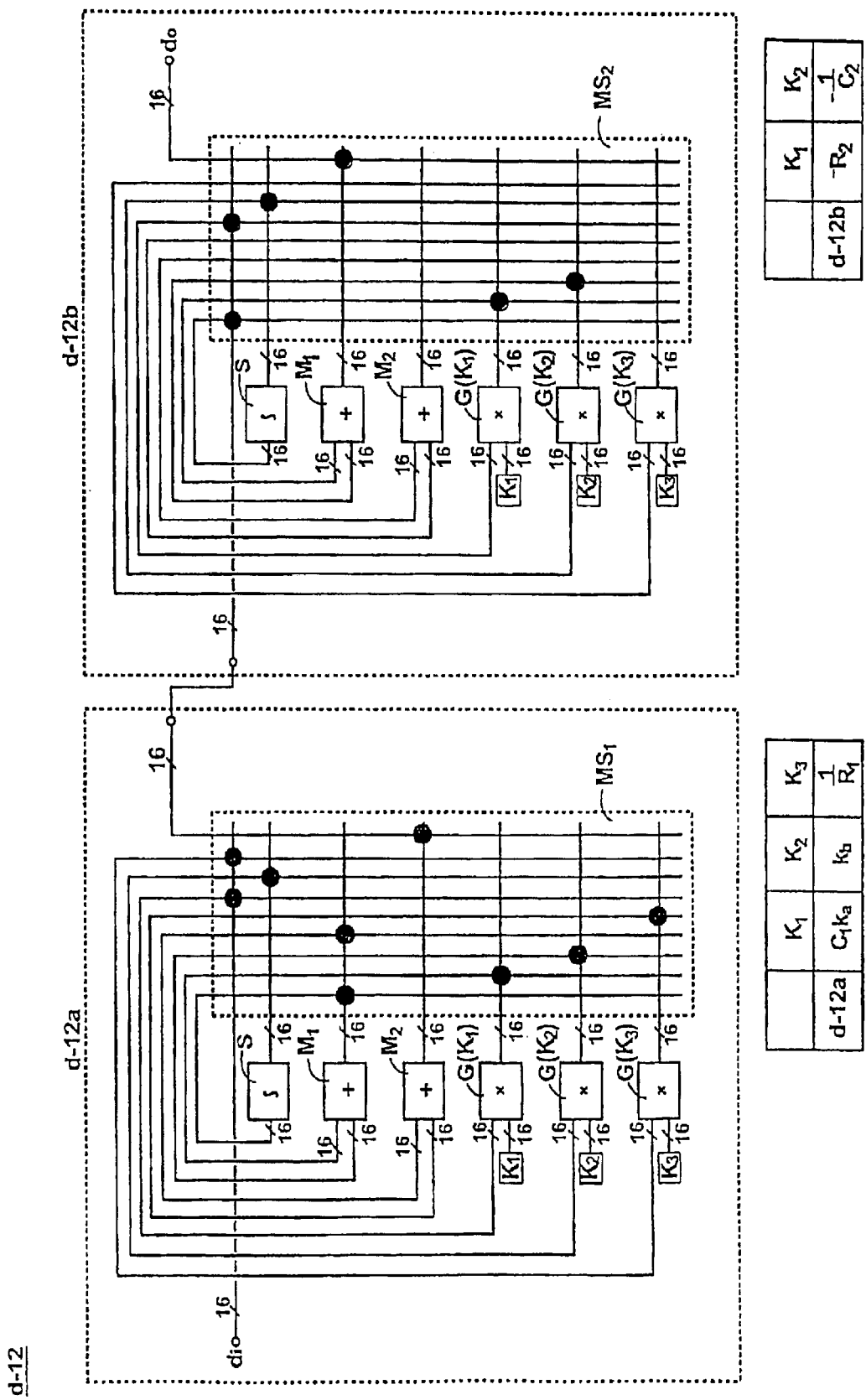
FIG. 10 is an explanatory diagram for showing conversion of PDIC of FIG. 1 into digital arithmetic basic circuit (d-12).
Figure 11:
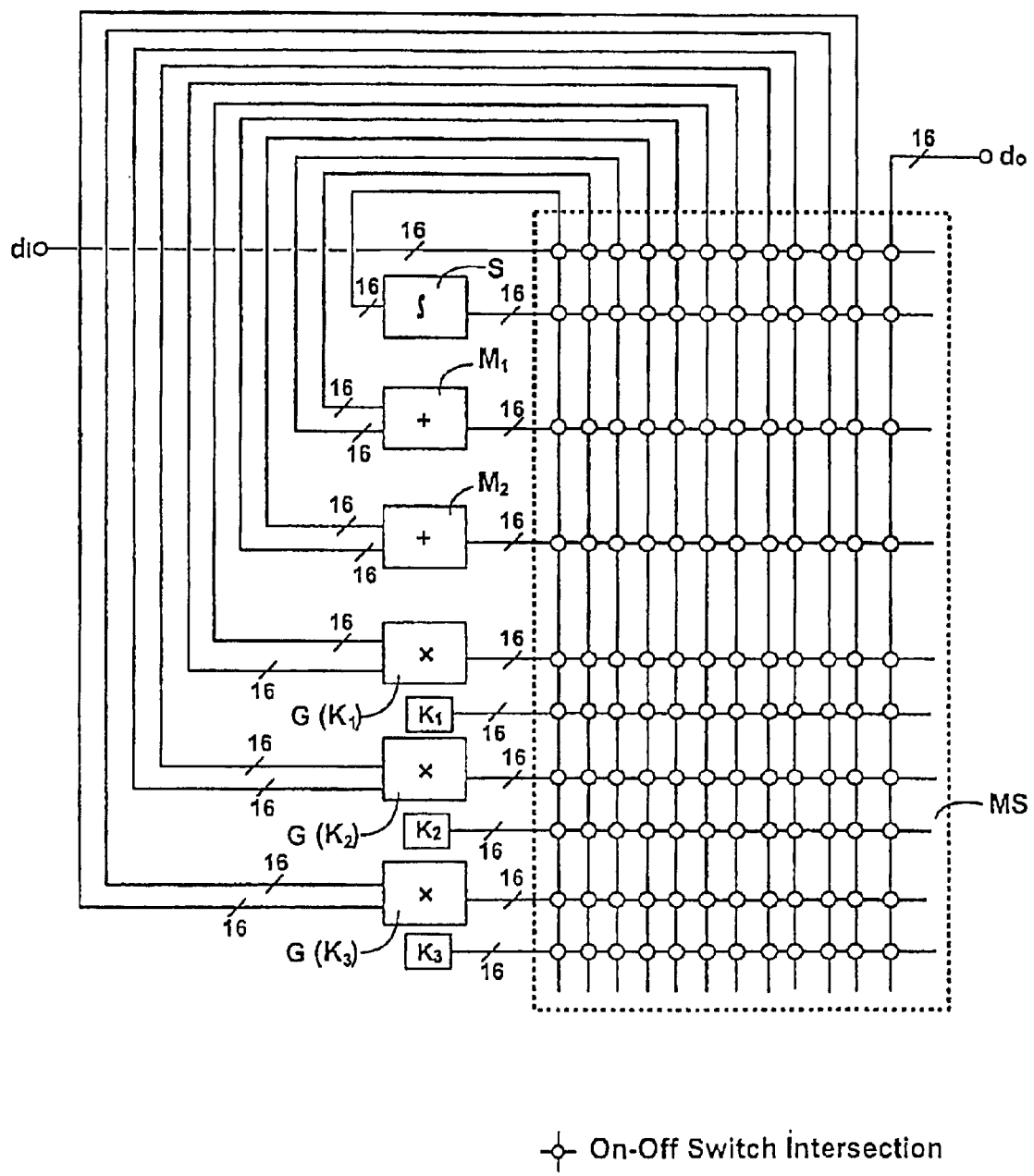
FIG. 11 is a basic circuit diagram showing another embodiment of PDIC of this invention.

By connecting in cascade two PDICs from FIG. 1 from which any one of basic digital arithmetic circuits (d-1) to (d-10) can be constituted and by operating each of the matrix switches, MS, and MS2, FIG. 9 shows as (d-11a) and (d-11b) an embodiment that constitutes basic digital arithmetic circuit (d-11), which cannot be realized by one of the PDICs shown in FIG. 1. Similarly, by connecting in cascade two PDICs shown in FIG. 1 and operating each of the matrix switches, $MS_1$, and $MS_2$, FIG. 10 shows as (d-12a) and (d-12b) an embodiment of a PDIC that constitutes basic digital arithmetic circuit (d-12), which cannot be realized with the one PDIC shown in FIG. 1, FIG. 11 shows an embodiment in which each coefficient value $K_1$, $K_2$ and $K_3$ is set via the matrix switches MS for each coefficient unit $G(K_1)$, $G(K_2)$ and $G(K_3)$. In this embodiment, a switch is provided to each of the intersections of the matrix switches MS as shown in white blank circles ○. Thus, the circuit is further generalized and a built-in arithmetic module can correspond to circuit structures (for example, a circuit that uses multiplication which is not a constant) other than basic digital arithmetic circuits (d-1) to (d-12).

Figure 12:
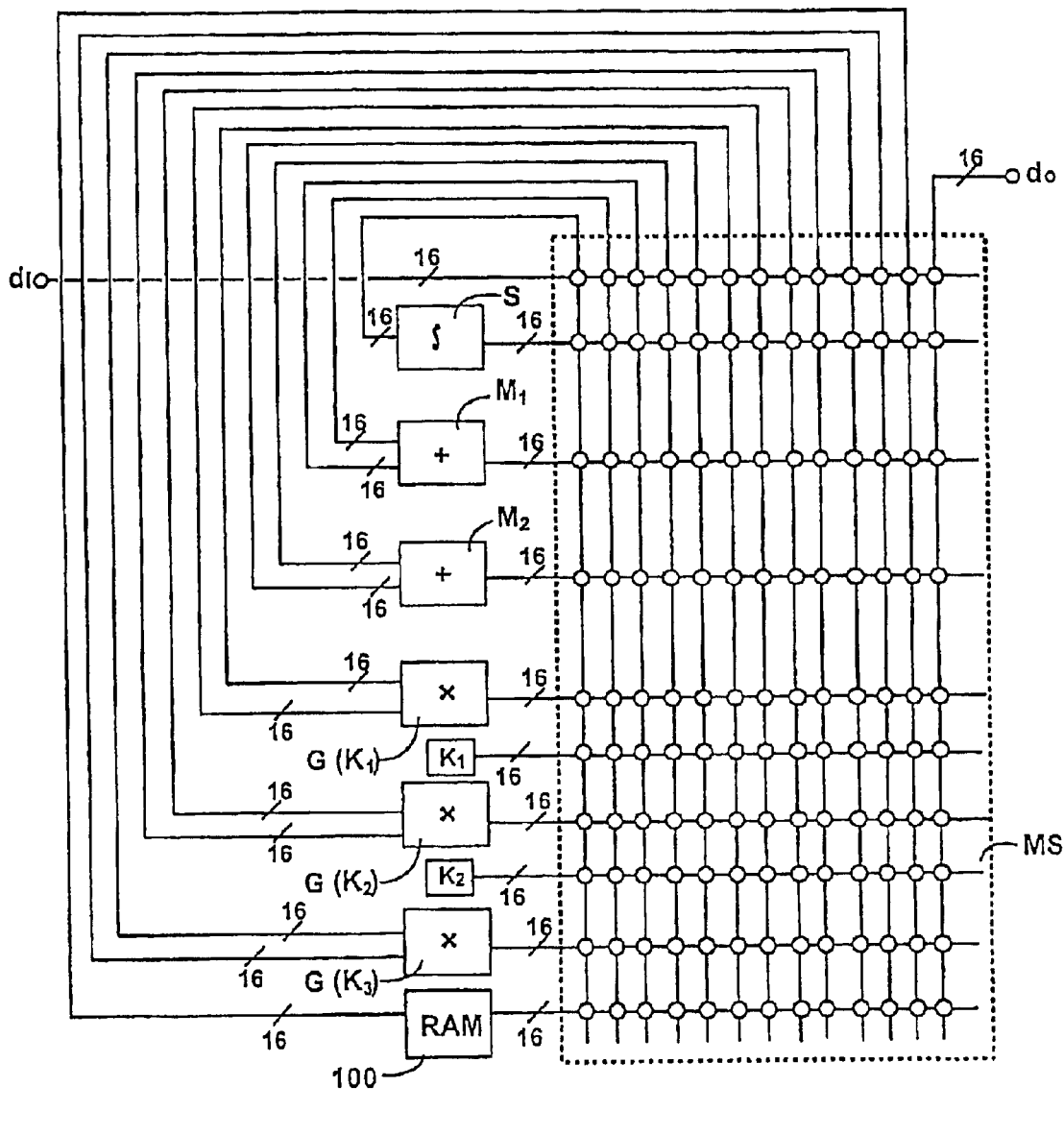
FIG. 12 is a basic circuit diagram showing yet another embodiment of PDIC of this invention.

FIG. 12 shows an embodiment of a PDIC that sets the coefficient values of coefficient units $G(K_1)$ or $G(K_2)$ or $G(K_3)$, by using a random access memory, RAM 100, to which the coefficient values are stored or which is allowed to be changed, with a "look-up table" method. By setting the coefficient value through writing a non-linear coefficient value into RAM 100 and setting the coefficient value with a "look-up table", it can correspond to a non-linear problem. when linear coefficient value $K_3$ is written to RAM 100, it can be used in a similar manner as the PDIC shown in FIG. 11.

Figure 13:
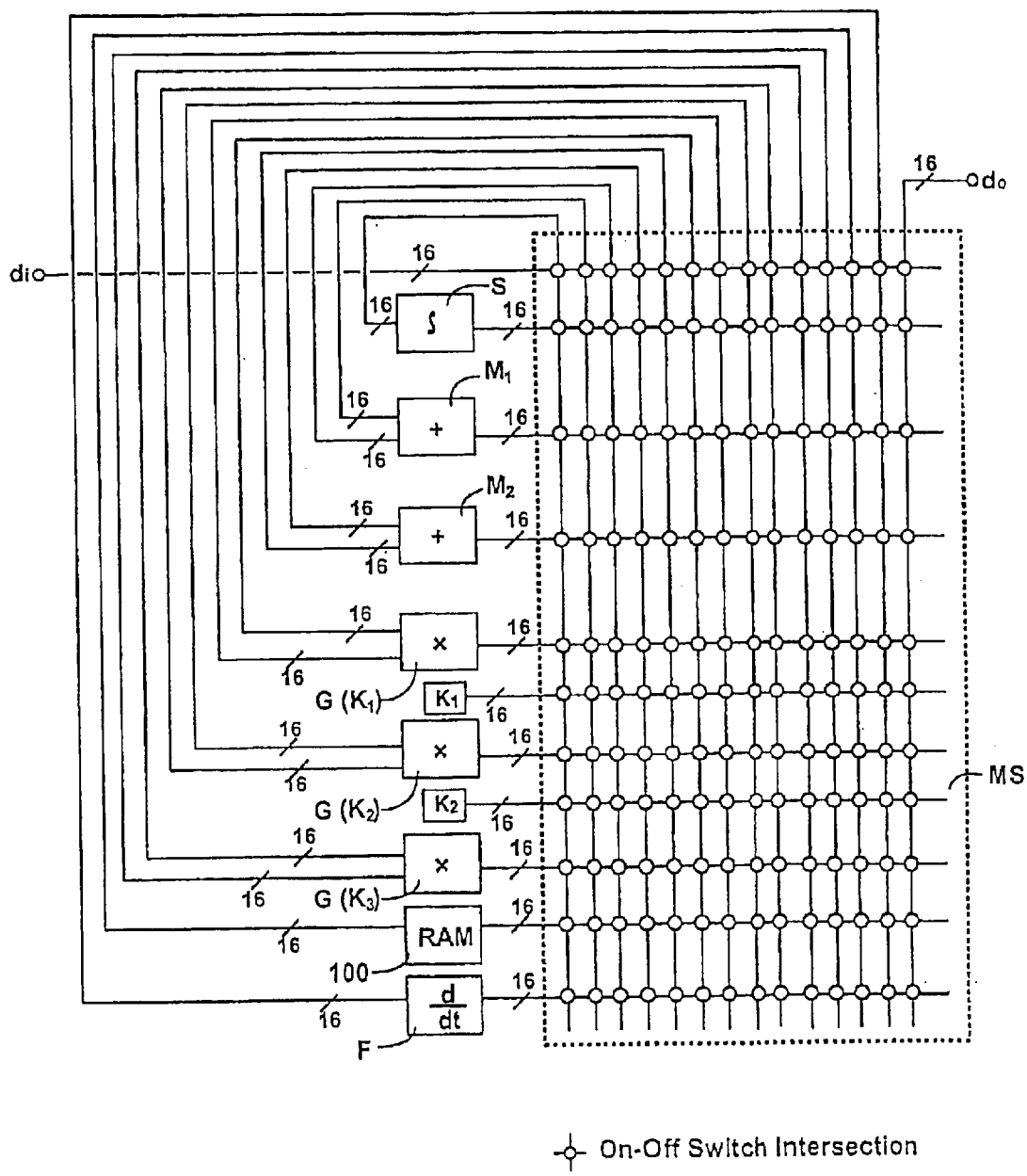
FIG. 13 is a basic circuit diagram showing further another embodiment of PDIC of this invention.

FIG. 13 shows an embodiment of a PDIC in which the setting of the coefficient units $G(K_1)$, $G(K_2)$ and $G(K_3)$ are carried out in RAM 100 at the same time that another differentiator F is added. The differentiator F can be comprised with fewer circuit elements than integrator S and it can be used directly (not an indirect method such as making a differentiator using an integrator, but rather, directly) for basic digital arithmetic circuits (d-7), (d-8), (d-11) and (d-12) that originally included a differentiation function. In addition, when differentiator F is combined further, the selection of basic digital arithmetic circuits (d-11) and (d-12) can be realized with one PDIC.

Figure 14:
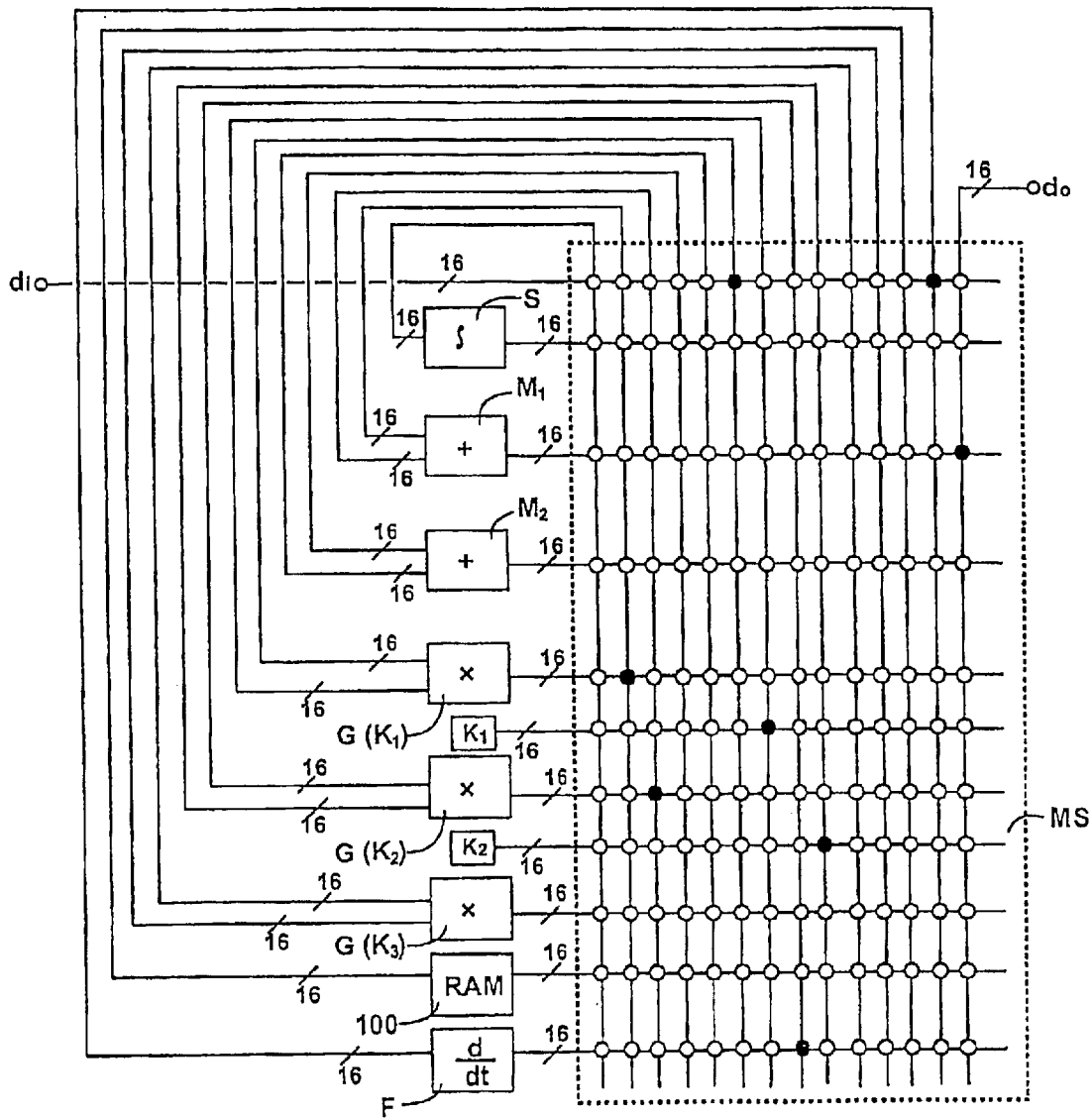
FIG. 14 is an explanatory diagram for showing conversion of PDIC of FIG. 13 into digital arithmetic basic circuits (d-7) and (d-8).
Figure 15:
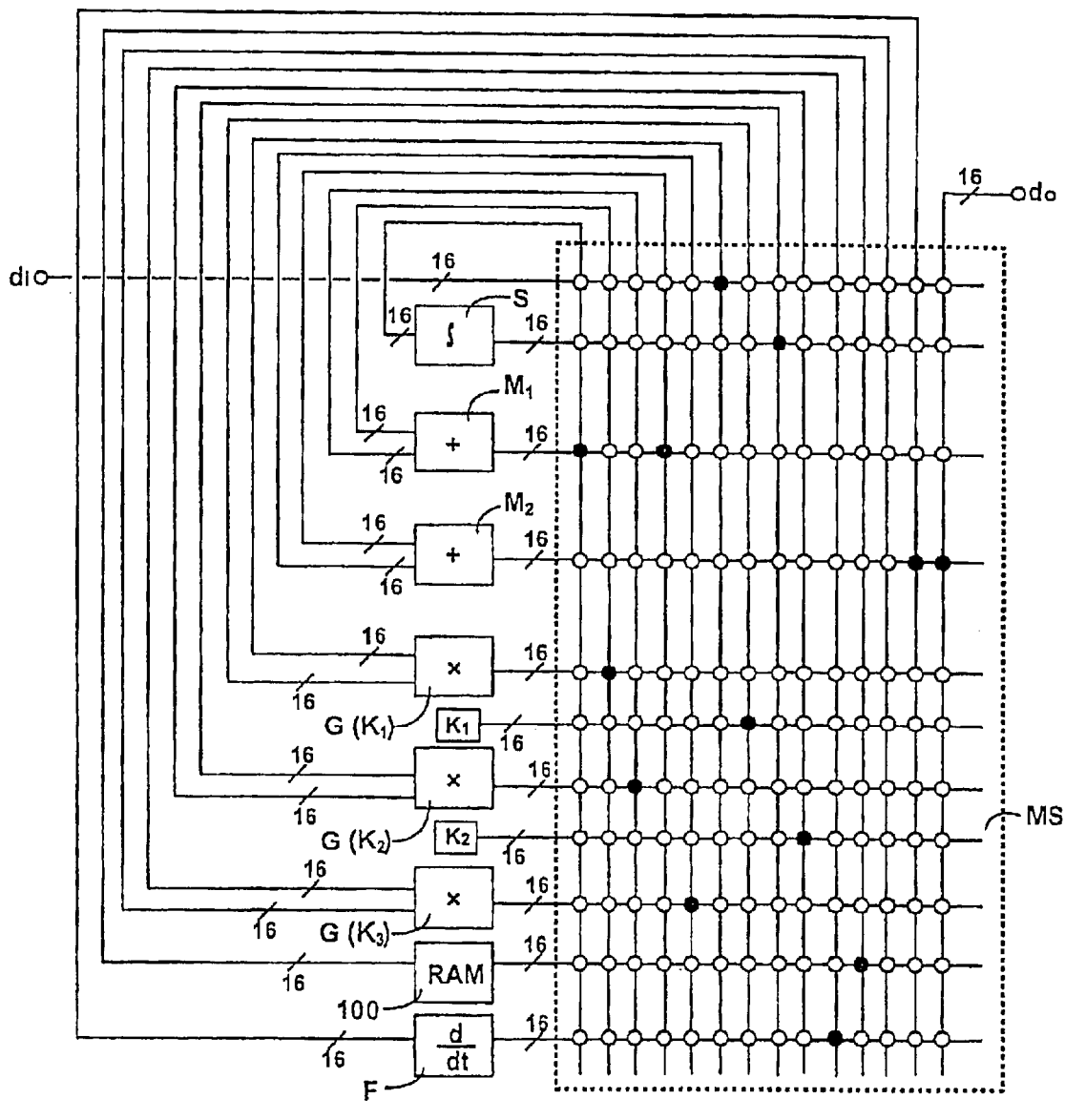
FIG. 15 is an explanatory diagram for showing conversion of PDIC of FIG. 13 into digital arithmetic basic circuit (d-11).
Figure 16:
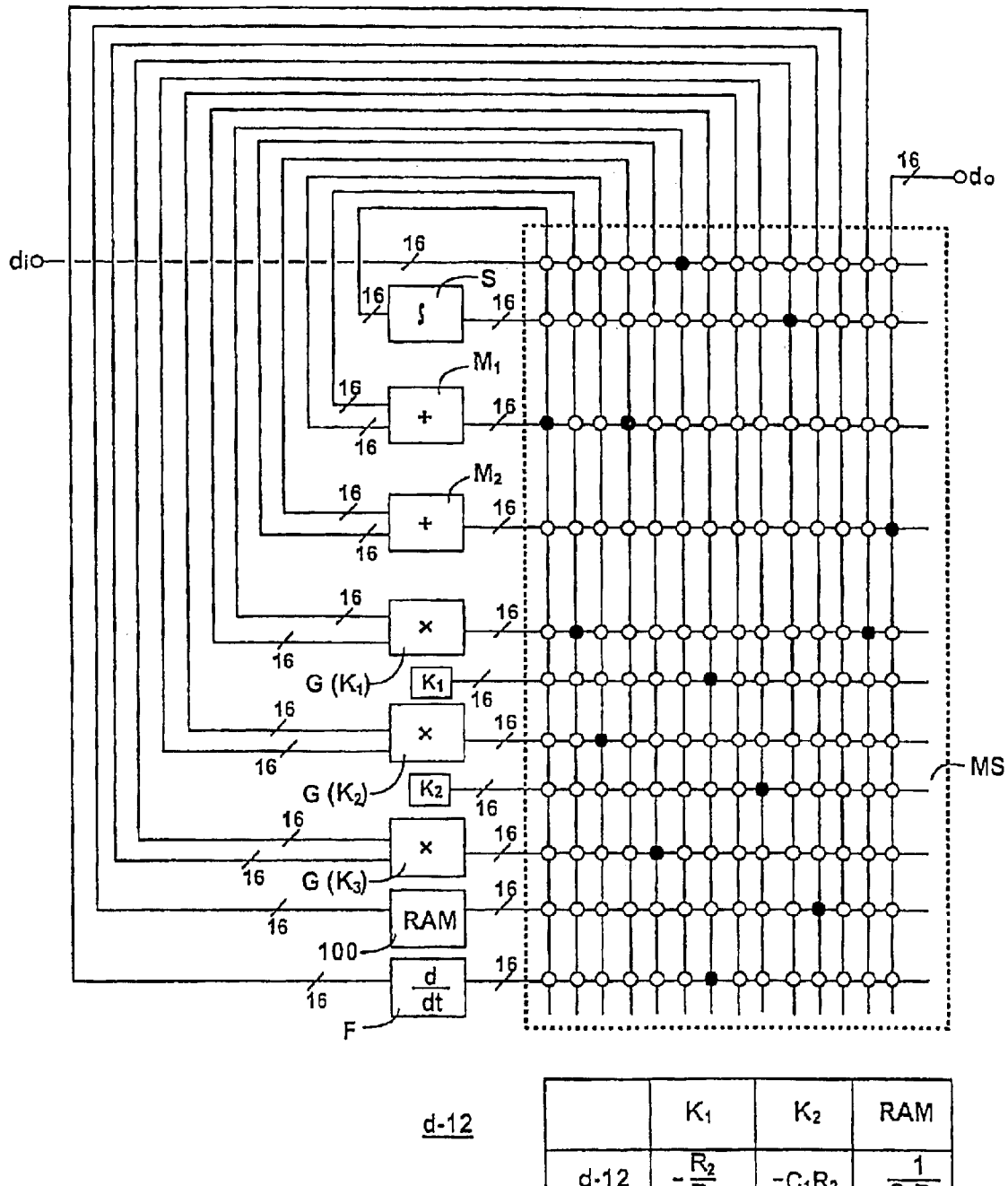
FIG. 16 is an explanatory diagram for showing conversion of PDIC of FIG. 13 into digital arithmetic basic circuit (d-12).

FIG. 14 demonstrates that basic digital arithmetic circuits (d-7) and (d-8) can be selectively constituted using the PDIC shown in FIG. 13. FIG. 15 demonstrates that basic digital arithmetic circuit (d-11) can be constituted using the PDIC shown in FIG. 13. FIG. 16 demonstrates that basic digital arithmetic circuit (d-12) can be constituted using the programmable digital arithmetic IC shown in FIG. 13.

Figure 17:
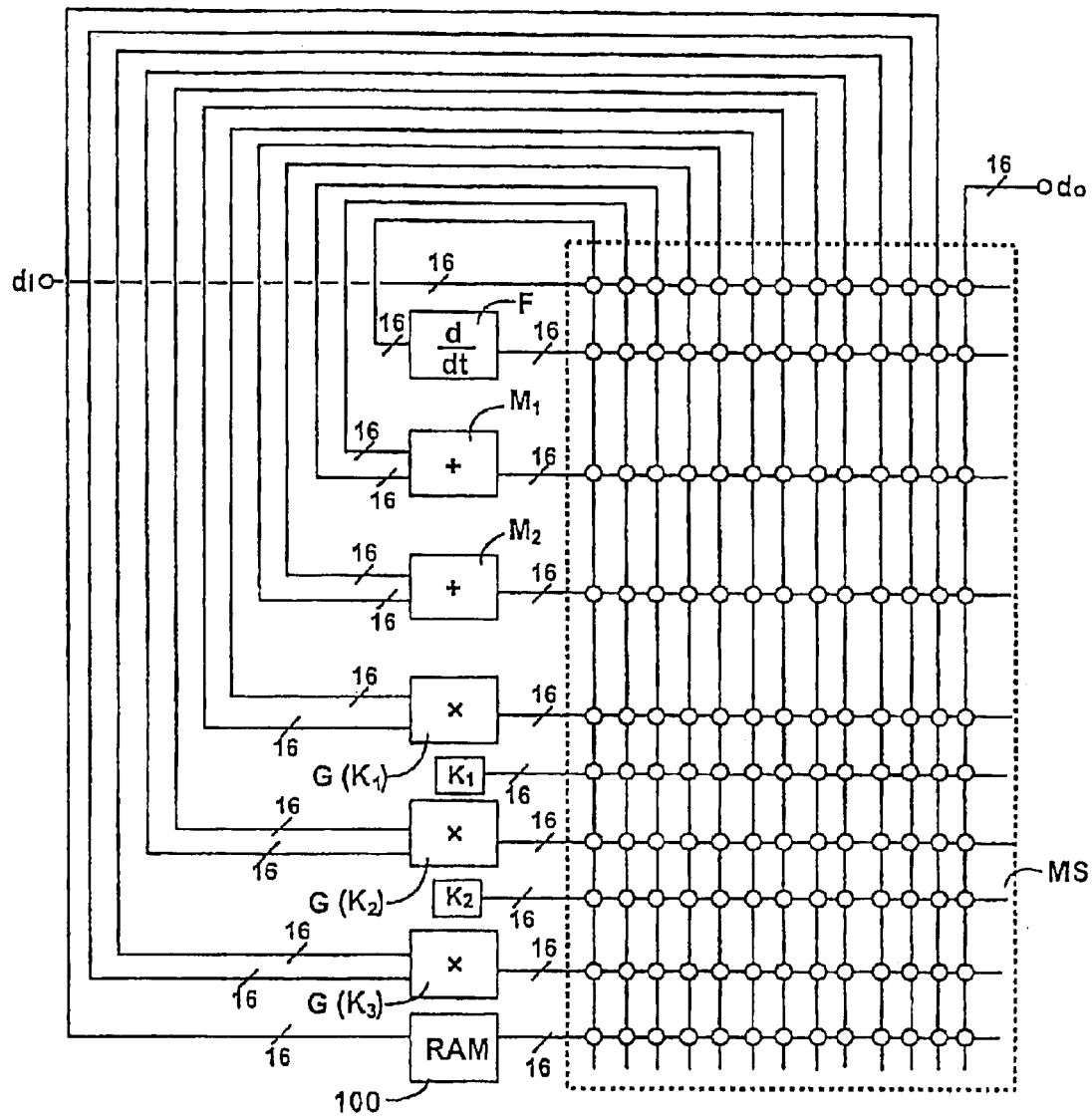
FIG. 17 is a basic circuit diagram showing still another embodiment of PDIC of this invention.
Figure 18:
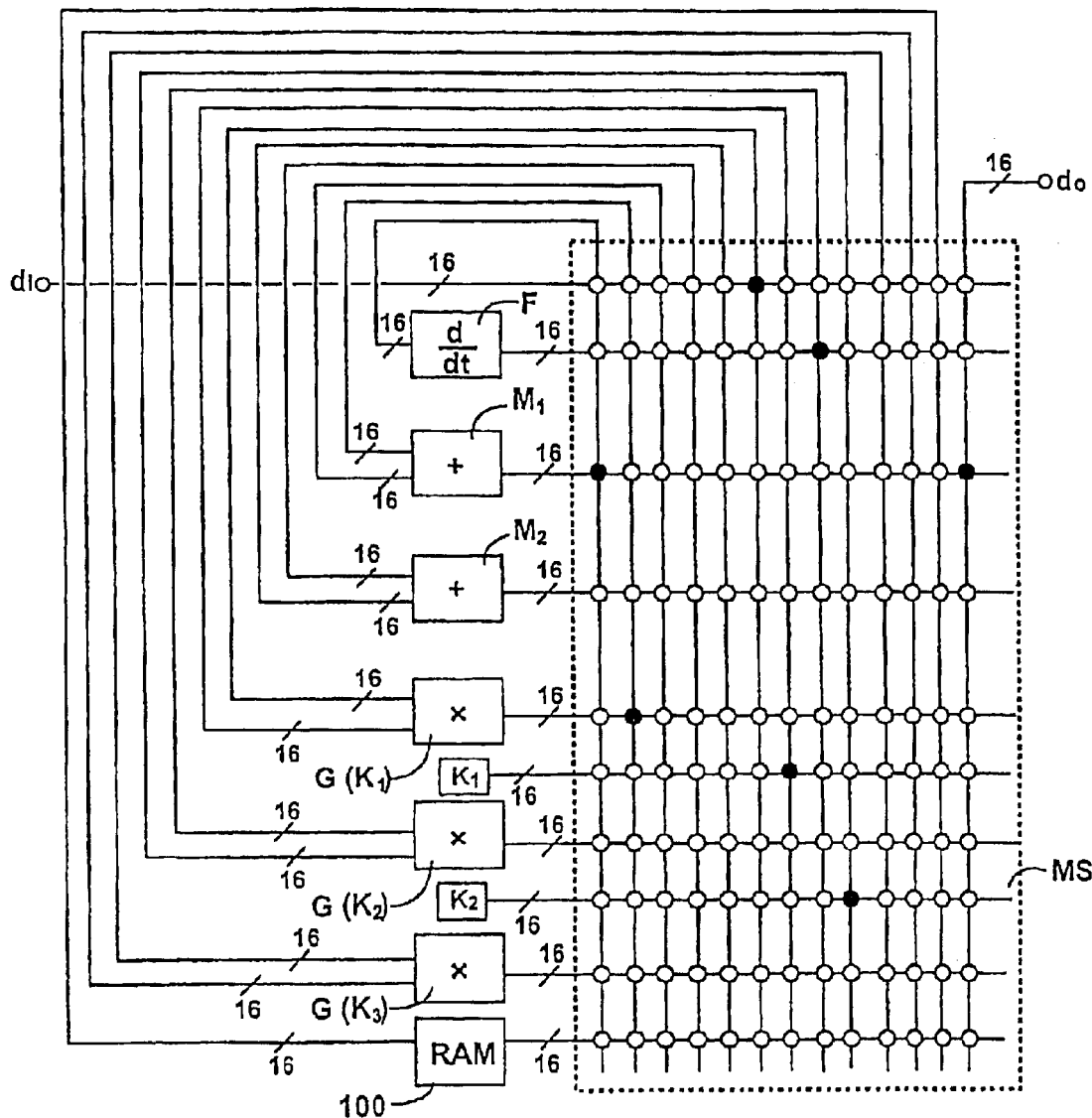
FIG. 18 is an explanatory diagram for showing conversion of PDIC of FIG. 17 into digital arithmetic basic circuits (d-1) and (d-2).
Figure 19:
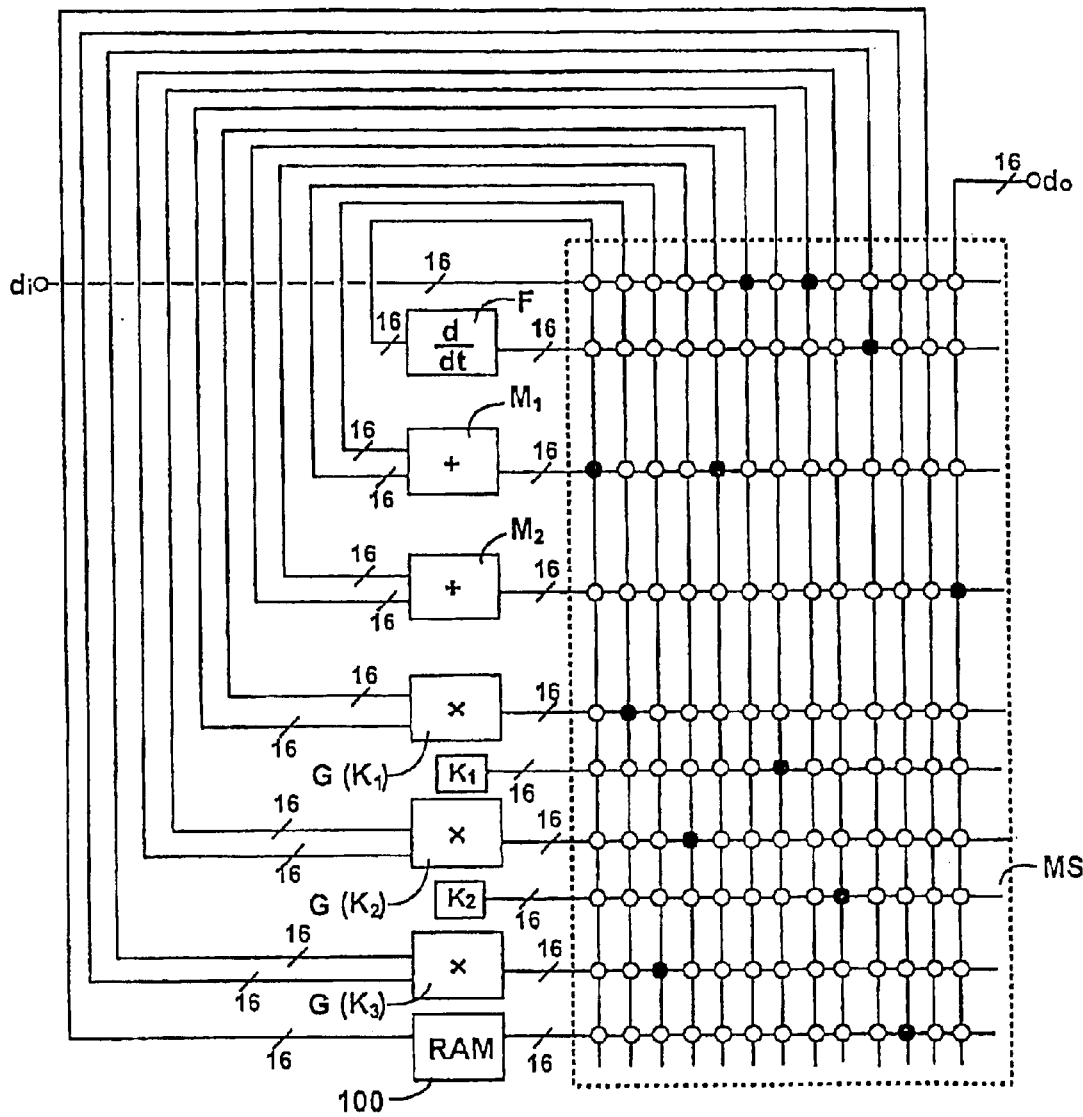
FIG. 19 is an explanatory diagram for showing conversion of PDIC of FIG. 17 into digital arithmetic basic circuits (d-3) and (d-5).
Figure 20:
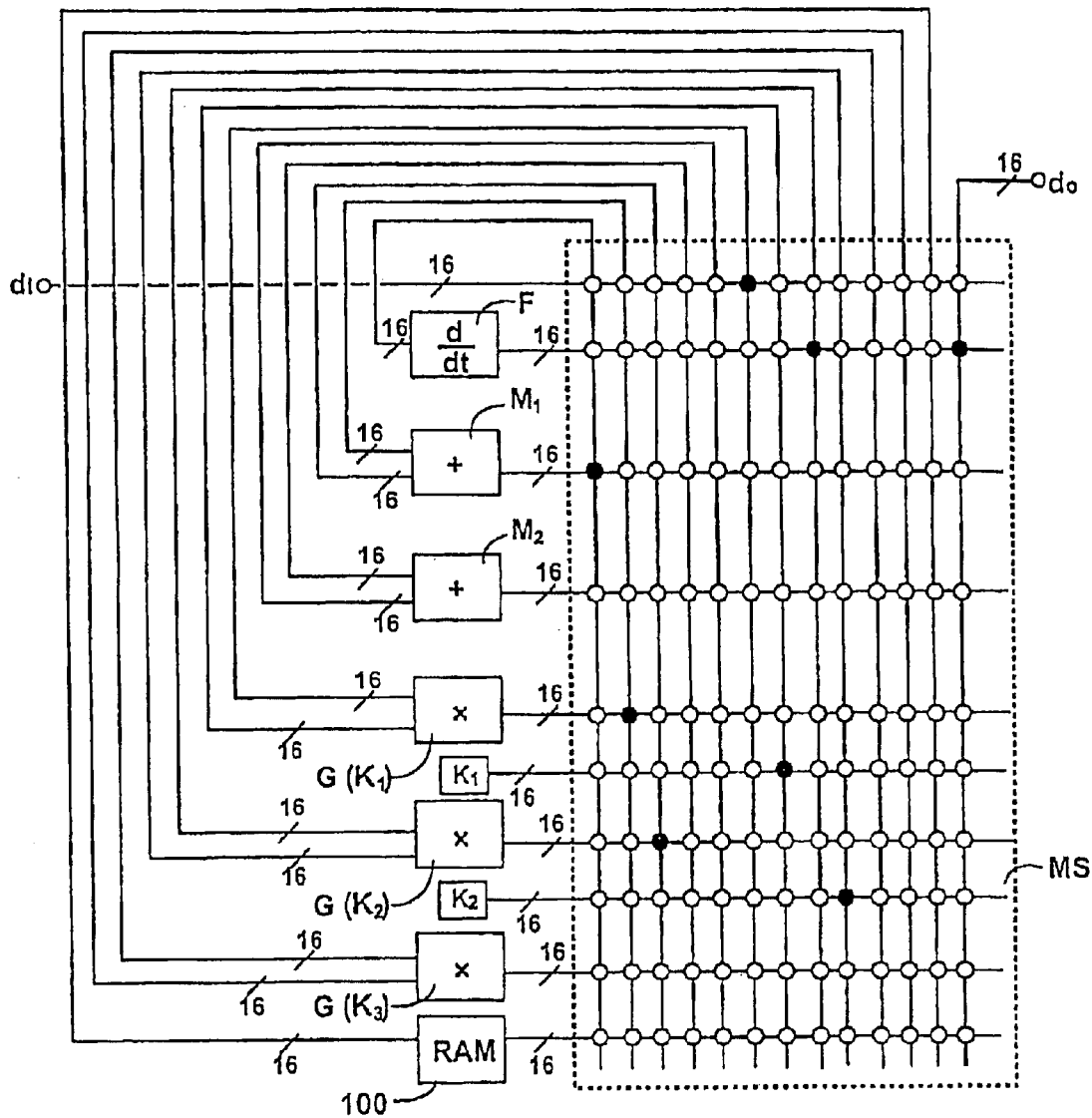
FIG. 20 is an explanatory diagram for showing conversion of PDIC of FIG. 17 into digital arithmetic basic circuits (d-4) and (d-6).
Figure 21:
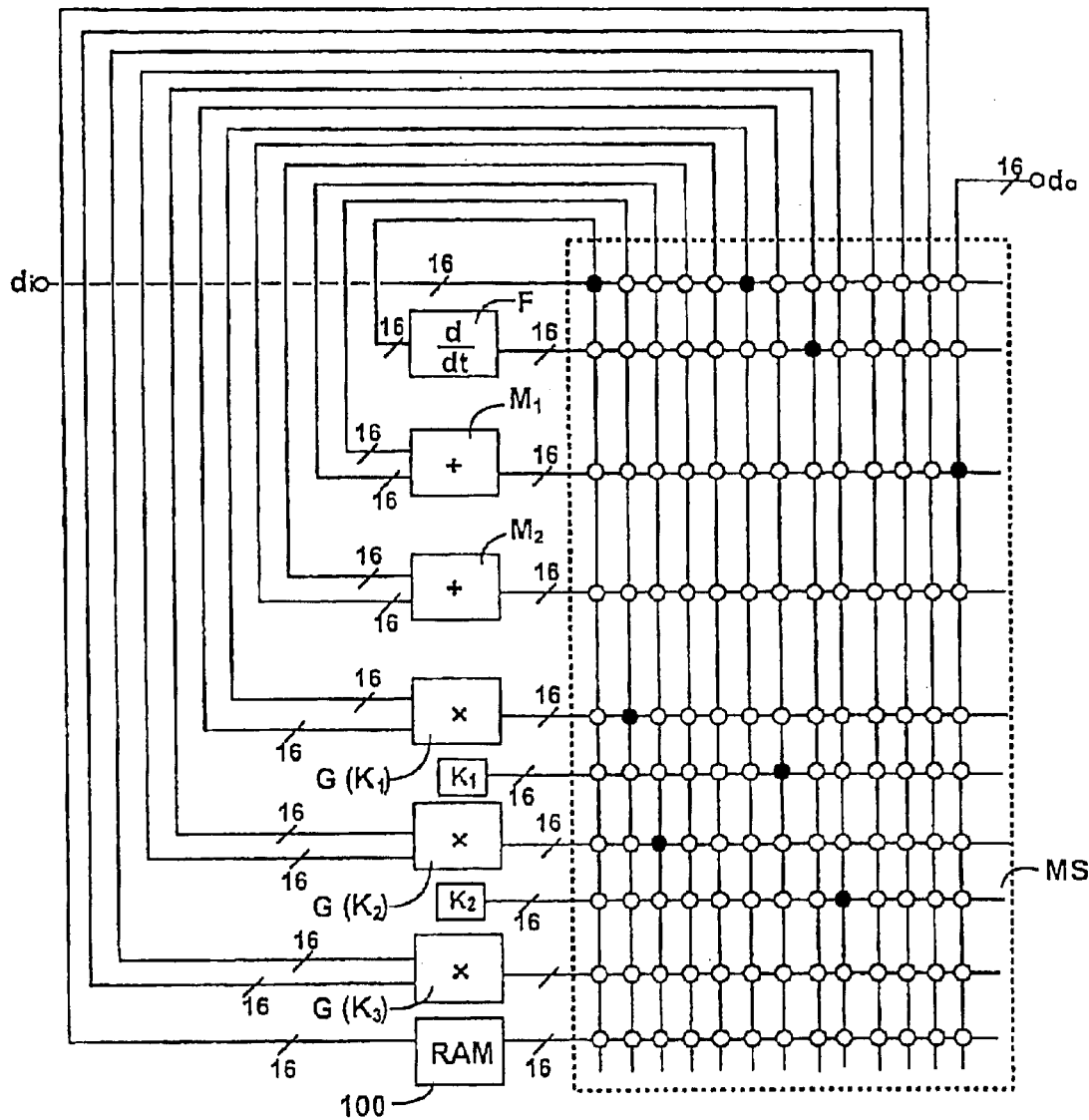
FIG. 21 is an explanatory diagram for showing conversion of PDIC of FIG. 17 into digital arithmetic basic circuits (d-7) and (d-8).
Figure 22:
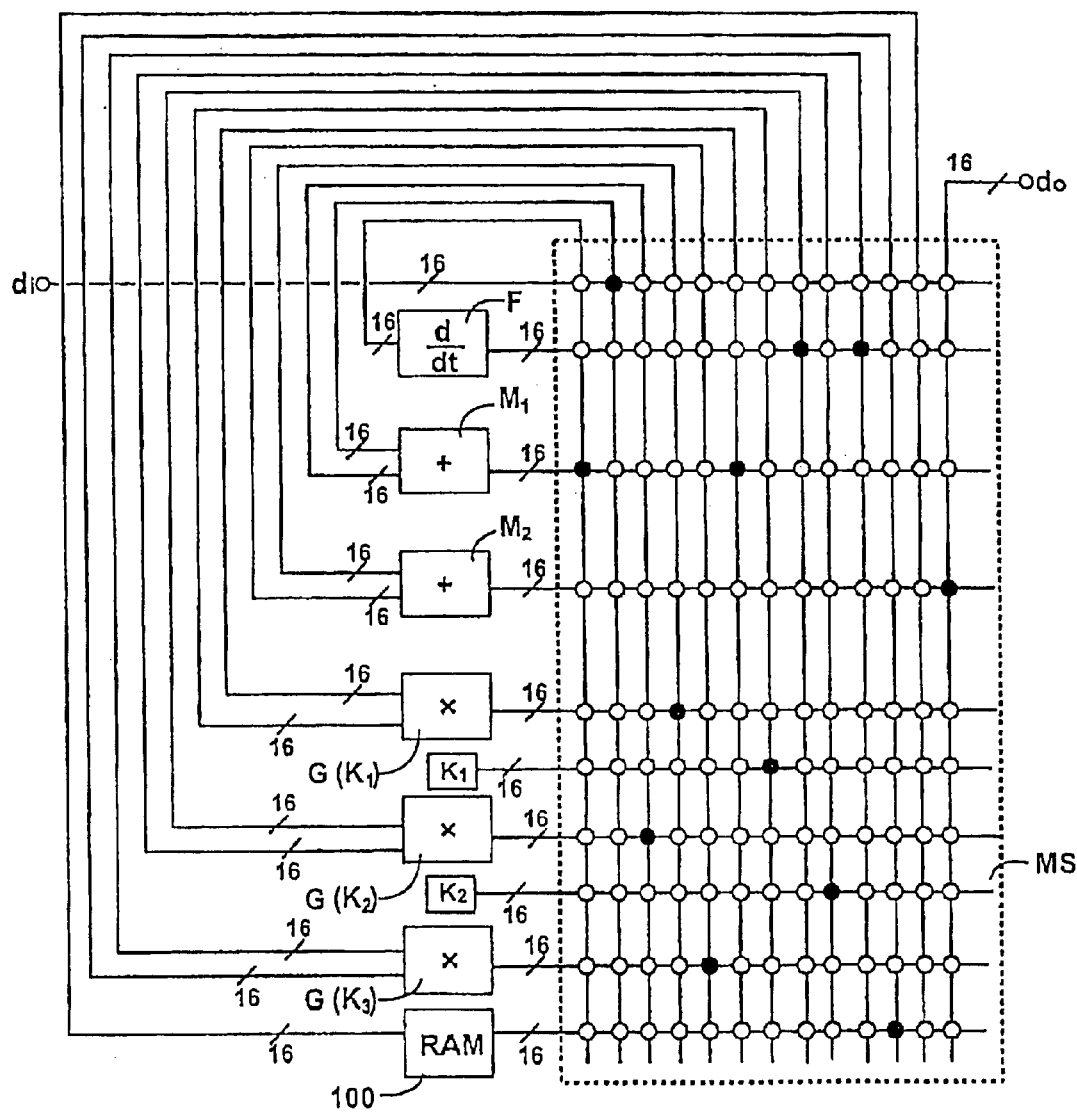
FIG. 22 is an explanatory diagram for showing conversion of PDIC of FIG. 17 into digital arithmetic basic circuits (d-9) and (d-10).
Figure 23:
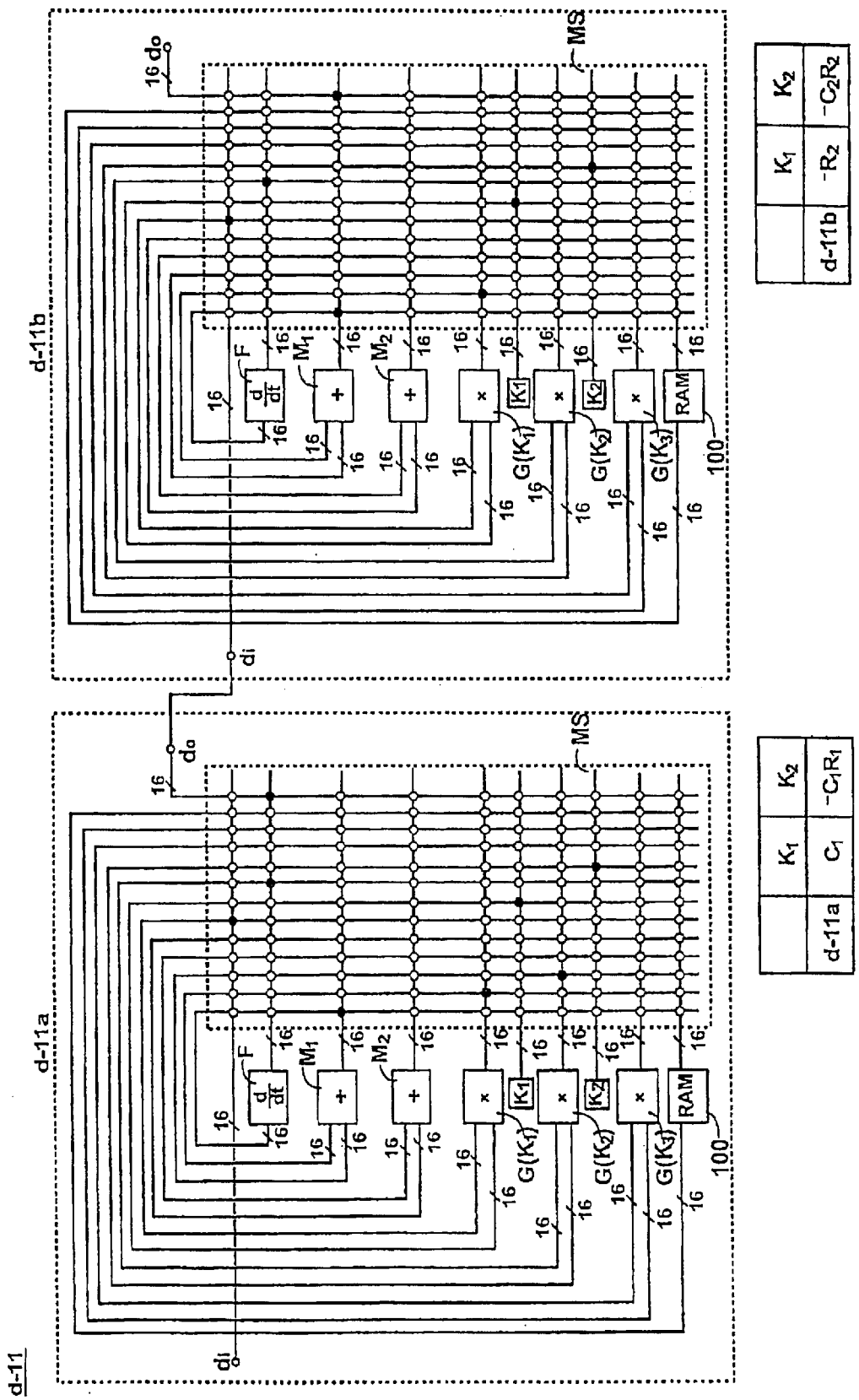
FIG. 23 is an explanatory diagram for showing conversion of yet another PDIC into digital arithmetic basic circuit (d-11).
Figure 24:
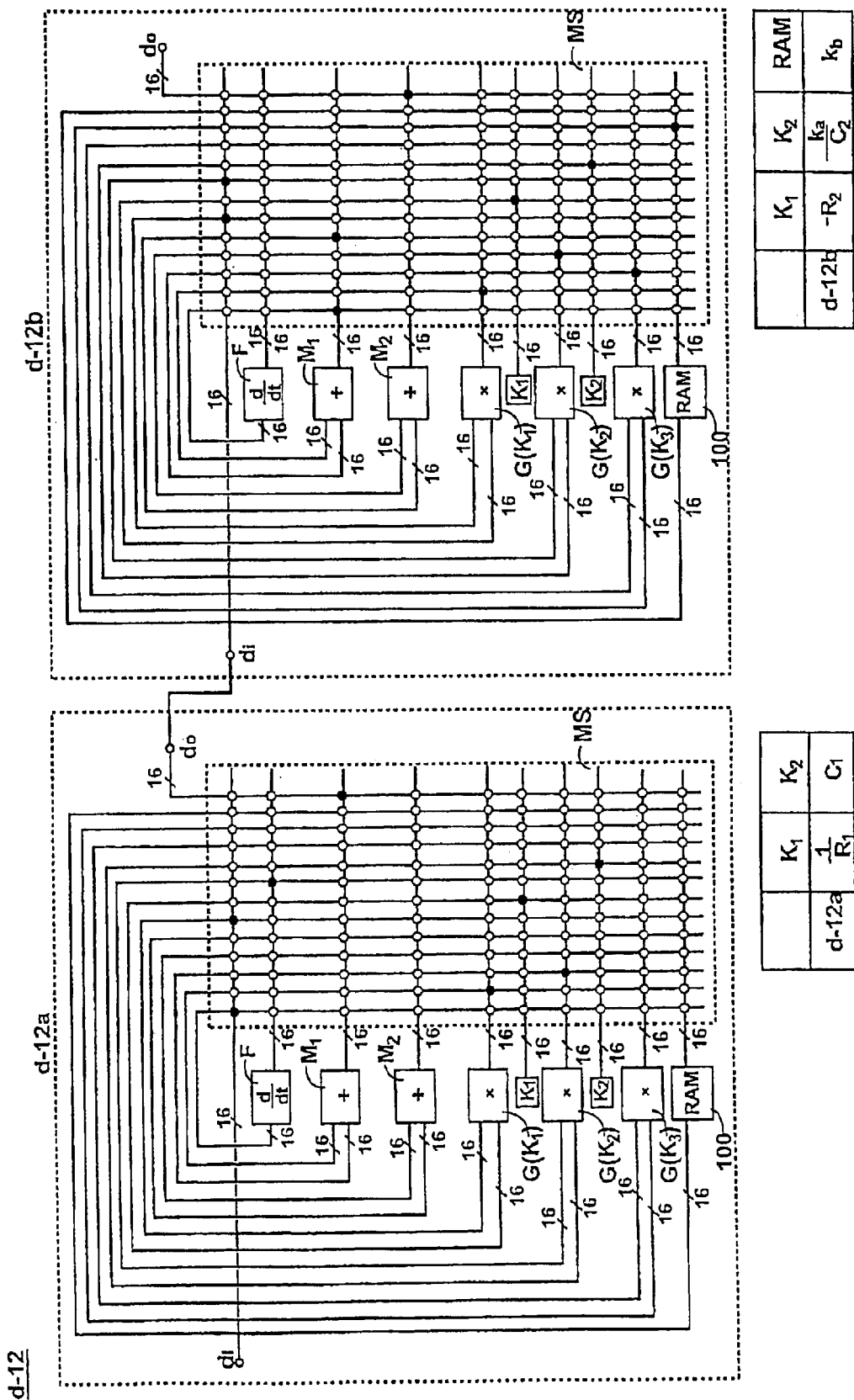
FIG. 24 is an explanatory diagram for showing conversion of PDIC of FIG. 23 into digital arithmetic basic circuit (d-12).

Integrator S can be structured as a circuit using differentiator F. By constituting the circuit shown in FIG. 17 and operating the matrix switches MS, the same function as the PDIC shown in said FIG. 1 can be realized. FIG. 18 demonstrates that basic digital arithmetic circuits (d-1) and (d-2) can be selectively constituted by using the PDIC shown in FIG. 17 and turning on the switching elements at the intersection of the matrix switches MS shown with the black dots. From the above, FIG. 19 demonstrates that basic digital arithmetic circuits (d-3) and (d-5) can be selectively constituted by using the PDIC shown in FIG. 17. FIG. 20 demonstrates that basic digital arithmetic circuits (d-4) and (d-6) can be selectively constituted by using the PDIC shown in FIG. 17. FIG. 21 demonstrates that basic digital arithmetic circuits (d-7) and (d-8) can be selectively constituted by using the PDIC shown in FIG. 17. FIG. 22 demonstrates that basic digital arithmetic circuits (d-9) and (d-10) can be selectively constituted by using the PDIC shown in FIG. 17. FIG. 23 demonstrates that basic digital arithmetic circuit (d-11) can be constituted by connecting in cascade the two PDICs shown in FIG. 17 and operating matrix switches MS. Similarly, FIG. 24 demonstrates that basic digital arithmetic circuit (d-12) can be constituted by connecting in cascade the two PDICs (d-12a) and (d-12b) and operating matrix switches MS.

These PDICs have a great benefit when used with a variety of simulators such as automatic control simulators, flight simulators, nuclear reactor simulators, high-rise building vibration simulators, pipeline simulators, elevator simulators, flooding simulators, medical simulators, power plant operation training simulators, mechanical or electrical emulators, and programmable digital control boards.

As clearly shown from the above-mentioned embodiment, with the present invention, by having the user operate a matrix switches for a digital arithmetic IC in the user's hand, the PDIC's circuit structure can be very easily switched and a digital arithmetic circuit or digital arithmetic device with the desired operation and function can be selected and constituted at any time by the user. In addition, changes in functions and the setting of the coefficients for the circuit of the PDIC are separated so that the programming and setting operations of the PDIC become extremely simple for the users. Consequently, the PDIC is easy to use for the user. In addition, the coefficient value of the coefficient unit circuit can be set with the physical condition separated from the changes in the function of the PDIC. Therefore, the number of coefficient units can be reduced due to the shared use of the coefficient unit for each digital arithmetic circuit and consequently the cost of the PDIC can be reduced.

Although only some exemplary embodiments of this invention have been described in detail above, those skilled in the art. will readily appreciated that many modifications are possible in the exemplary embodiments without materially departing from the novel teachings and advantages of this invention. Accordingly, all such modifications are intended to be included within the scope of this invention.

What is claimed is:

1. A programmable digital arithmetic circuit comprising: a plurality of elemental circuits and a plurality of matrix switches, wherein each of the elemental circuits has one of a plurality of first operational functions and comprises input and output terminals, the input and output terminals of the elemental circuits are connected to each other via the matrix switches, further wherein a basic digital arithmetic circuit with a second operational function is formed by selectively turning on and off said plurality of matrix switches.

2. The programmable digital arithmetic circuit according to claim 1, wherein said plurality of elemental circuits having one of a plurality of first operational functions is selected from a group consisting of an integrator, a differentiator, an adder and a coefficient unit.

3. The programmable digital arithmetic circuit according to claim 2, wherein said coefficient unit is a random access memory that stores a coefficient value.

4. The programmable digital arithmetic circuit according to claim 3, wherein said coefficient value is a non-linear coefficient value.

5. The programmable digital arithmetic circuit according to claim 1, wherein said plurality of elemental circuits are a plurality of integrators and/or differentiators, and a plurality of adders and a plurality of coefficient units.

6. A digital arithmetic circuit comprising two or more programmable digital arithmetic circuits according to claim 1, wherein a first output terminal of a first programmable digital arithmetic circuit is connected to a second input terminal of a second programmable digital arithmetic circuit.

7. An arithmetic unit comprising one or more programmable digital arithmetic circuits according to claim 1.

8. A simulator device comprising one or more programmable digital arithmetic circuits according to claim 1.

9. An emulator device comprising one or more programmable digital arithmetic circuits according to claim 1.

10. A programmable digital control board device comprising one or more programmable digital arithmetic circuits according to claim 1.

11. The programmable digital arithmetic circuit according to claim 1, wherein the basic digital arithmetic circuit with the second operational function is one selected from the group comprising a first order lag integral basic digital arithmetic circuit, a proportional integral basic digital arithmetic circuit, an approximate differentiation basic digital arithmetic circuit, a proportional differentiation basic digital arithmetic circuit, a capacitive compensation basic digital arithmetic circuit, and an aperiodic basic digital arithmetic circuit.

12. The programmable digital arithmetic circuit according to claim 1, wherein programmable digital arithmetic circuit is an integrated circuit.

13. A method of making a programmable digital arithmetic circuit comprising steps of:

selecting a plurality of basic analog arithmetic circuits each having different first operational functions;

converting said basic analog arithmetic circuits into a plurality of digital arithmetic basic circuit having the first operational functions;

determining number of each of integrators and/or differentiators, adders and coefficient units to constitute a basic digital arithmetic circuit having a second operational function, and connecting the integrators and/or differentiators, adders and coefficient units with each other via a matrix switches to form the basic digital arithmetic circuit having the second operational function.

14. The method of making a programmable digital arithmetic circuit according to claim 13, wherein said number is 1.

15. The method of making a programmable digital arithmetic circuit according to claim 13, further comprising a step of:

turning on or off switching elements at intersections of the matrix switches.

16. The method of making a programmable digital arithmetic circuit according to claim 13, wherein the basic digital arithmetic circuit having the second operational function is one selected from the group comprising a first order lag integral basic digital arithmetic circuit, a proportional integral basic digital arithmetic circuit, an approximate differentiation basic digital arithmetic circuit, a proportional differentiation basic digital arithmetic circuit, a capacitive compensation basic digital arithmetic circuit, and an aperiodic basic digital arithmetic circuit.

* * * * *